US012080248B2

(12) United States Patent
Shin et al.

(10) Patent No.: US 12,080,248 B2
(45) Date of Patent: Sep. 3, 2024

(54) DISPLAY APPARATUS HAVING AN IN-PIXEL GATE DRIVING CIRCUIT WITH PLURALITY OF NORMAL AND DUMMY STAGES

(71) Applicant: Samsung Display Co., Ltd., Yongin-Si (KR)

(72) Inventors: Dong Hee Shin, Asan-si (KR); Sunkwun Son, Suwon-si (KR); Nahyeon Cha, Yongin-si (KR); Donghyeon Ki, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/317,035

(22) Filed: May 11, 2021

(65) Prior Publication Data

US 2022/0059038 A1 Feb. 24, 2022

(30) Foreign Application Priority Data

Aug. 20, 2020 (KR) ........................ 10-2020-0104754

(51) Int. Cl.
*G09G 3/3291* (2016.01)

(52) U.S. Cl.
CPC ... *G09G 3/3291* (2013.01); *G09G 2310/0272* (2013.01)

(58) Field of Classification Search
CPC .................................................... G09G 3/3291
USPC .......................................................... 345/204
See application file for complete search history.

(56) References Cited

U.S. PATENT DOCUMENTS

| | | | |
|---|---|---|---|
| 8,471,981 B2 | 6/2013 | Kim et al. | |
| 9,305,508 B2 | 4/2016 | Park et al. | |
| 10,777,159 B2 | 9/2020 | Takeuchi et al. | |
| 10,810,965 B2 | 10/2020 | Seong et al. | |
| 2009/0174695 A1* | 7/2009 | Nojiri | G02F 1/13454 345/206 |
| 2012/0194773 A1* | 8/2012 | Kim | G09G 3/3674 349/139 |
| 2013/0321499 A1* | 12/2013 | Park | G09G 3/3688 345/698 |

(Continued)

FOREIGN PATENT DOCUMENTS

| | | |
|---|---|---|
| KR | 1020120088971 A | 8/2012 |
| KR | 1020160079977 A | 7/2016 |

(Continued)

*Primary Examiner* — Long D Pham
(74) *Attorney, Agent, or Firm* — CANTOR COLBURN LLP

(57) ABSTRACT

A display apparatus includes a display panel, a data driving circuit and a gate driving circuit. The display panel displays an image and includes a plurality of pixels. The data driving circuit applies a data voltage to a data line of the display panel. The gate driving circuit applies a gate output signal to a gate line of the display panel. The gate driving circuit is disposed between opening portions in a display area of the display panel. The gate driving circuit includes a normal stage column extending in a pixel column direction of the display panel and including a plurality of normal stages and a dummy stage column disposed adjacent to an end portion of the normal stage column in a pixel row direction and including a plurality of dummy stages.

20 Claims, 16 Drawing Sheets

(56) References Cited

U.S. PATENT DOCUMENTS

| | | | | |
|---|---|---|---|---|
| 2016/0019856 | A1* | 1/2016 | Tanaka | G09G 3/3677 345/206 |
| 2016/0267831 | A1* | 9/2016 | Seo | G09G 3/2085 |
| 2017/0154596 | A1* | 6/2017 | Nishiyama | G09G 3/3696 |
| 2017/0287381 | A1* | 10/2017 | Park | G02F 1/1362 |
| 2018/0068629 | A1* | 3/2018 | Shin | G09G 3/3688 |
| 2019/0251921 | A1* | 8/2019 | Ono | G11C 19/184 |
| 2020/0015370 | A1* | 1/2020 | Kim | H05K 5/0204 |

FOREIGN PATENT DOCUMENTS

| | | | |
|---|---|---|---|
| KR | 1020180073787 | A | 7/2018 |
| KR | 102022698 | B1 | 11/2019 |
| KR | 1020190134989 | A | 12/2019 |

* cited by examiner

DISPLAY APPARATUS HAVING AN IN-PIXEL GATE DRIVING CIRCUIT WITH PLURALITY OF NORMAL AND DUMMY STAGES

This application claims priority to Korean Patent Application No. 10-2020-0104754, filed on Aug. 20, 2020, and all the benefits accruing therefrom under 35 U.S.C. § 119, the content of which in its entirety is herein incorporated by reference.

BACKGROUND

1. Field

Embodiments of the invention relate to a display apparatus and a display system including the display apparatus. More particularly, embodiments of the invention relate to a display apparatus including a gate driving circuit disposed in a display area of a display panel and a display system including the display apparatus.

2. Description of the Related Art

Recently, interest in display apparatuses is increasing. Accordingly, various types of display apparatus such as an organic light emitting diode ("OLED") display apparatus and a liquid crystal display ("LCD") apparatus are widely used in various fields.

In addition, study is being conducted to enlarge a display system. The enlarged display system may include a plurality of display panels. Such a display system may include a tiled display system which combines a plurality of display apparatuses to form one display system.

SUMMARY

In a tiled display system, if a data driver is disposed on a first side of one display apparatus included in the tiled display system and a gate driver is disposed on a second side of the one display apparatus included in the tiled display system perpendicular to the first side, a width of a dead space of the tiled display system may increase or a width of a seam line corresponding to an area where the display apparatuses are connected to each other may increase due to the data driver or the gate driver when forming the tiled display system.

Embodiments of the invention provide a display apparatus including a gate driving circuit disposed in a display area of a display panel to reduce a width of a dead space of the display apparatus and to reduce a width of a dead space and a width of a seam line of a display system in which a plurality of display apparatuses are connected.

Embodiments of the invention also provide a display system including the display apparatus.

In an embodiment of a display apparatus according to the invention, the display apparatus includes a display panel, a data driving circuit and a gate driving circuit. In such an embodiment, the display panel displays an image and includes a plurality of pixels, the data driving applies a data voltage to a data line of the display panel, and the gate driving circuit is applies a gate output signal to a gate line of the display panel. In such an embodiment, the gate driving circuit is disposed between opening portions in a display area of the display panel, and the gate driving circuit includes a normal stage column extending in a pixel column direction of the display panel and including a plurality of normal stages and a dummy stage column disposed adjacent to an end portion of the normal stage column in a pixel row direction and including a plurality of dummy stages.

In an embodiment, the data driving circuit may be disposed adjacent to a first side of the display panel and connected to the display panel.

In an embodiment, each of the normal stages may apply the gate output signal to a single corresponding pixel row, and each of the normal stages may be disposed at an area corresponding to a plurality of pixel columns.

In an embodiment, a normal stage of the normal stages may include a plurality of transistors. In such an embodiment, a first group of the transistors may be disposed between an M-th pixel column and an (M+1)-th pixel column, and a second group of the transistors may be disposed between the (M+1)-th pixel column and an (M+2)-th pixel column, where M is a positive integer.

In an embodiment, each of the dummy stages may be disposed at an area corresponding to a plurality of pixel columns.

In an embodiment, at least one of the dummy stages may output a reset carry signal to turn off the gate output signal to at least one of the normal stages.

In an embodiment, a dummy stage of the dummy stages may include a plurality of dummy transistors. In such an embodiment, a first group of the dummy transistors may be disposed between an L-th pixel column and an (L+1)-th pixel column, and a second group of the dummy transistors may be disposed between the (L+1)-th pixel column and an (L+2)-th pixel column, where L is a positive integer different from M.

In an embodiment, a normal stage of the normal stages may include a pull-up control part which applies a previous carry signal of one of previous stages to a first node in response to the previous carry signal, a pull-up part which output a clock signal as an N-th gate output signal in response to a signal at the first node, a carry part which outputs the clock signal as an N-th carry signal in response to the signal at the first node, a first pull-down part which pull down the signal at the first node to a second off voltage in response to a first next carry signal of one of next stages and a second pull-down part which pulls down the N-th gate output signal to a first off voltage in response to a second next carry signal of another of the next stages different from the first next carry signal, where N is a positive integer.

In an embodiment, the first next carry signal may have a timing later than a timing of the second next carry signal.

In an embodiment, the first next carry signal may be a carry signal of a third next stage disposed at a third next stage position from a present stage. The second next carry signal may be a carry signal of a second next stage disposed at a second next stage position from the present stage.

In an embodiment, the gate driving circuit may include one normal stage column disposed at a first end portion of the display panel in a first direction and one dummy stage column disposed at a second end portion of the display panel in the first direction.

In an embodiment, the gate driving circuit may include a first normal stage column disposed at a first end portion of the display panel in a first direction, a first dummy stage column disposed at a central portion of the display panel in the first direction, a second normal stage column disposed at a second end portion of the display panel in the first direction and a second dummy stage column disposed at the central portion of the display panel in the first direction and adjacent to the first dummy stage column.

In an embodiment, the data driving circuit may include a plurality of data driving chips, and the display panel may be divided into a plurality of sub areas corresponding to the data driving chips. In such an embodiment, the gate driving circuit may include one normal stage column and one dummy stage column for each of the sub areas.

In an embodiment of a display system according to the invention, the display system includes a plurality of display apparatuses connected to each other. In such an embodiment, each of the display apparatuses includes a display panel which displays an image and comprising a plurality of pixels, a data driving circuit which applies a data voltage to a data line of the display panel and a gate driving circuit which applies a gate output signal to a gate line of the display panel. In such an embodiment, the gate driving circuit is disposed between opening portions in a display area of the display panel, and the gate driving circuit includes a normal stage column extending in a pixel column direction of the display panel and including a plurality of normal stages and a dummy stage column disposed adjacent to an end portion of the normal stage column in a pixel row direction and including a plurality of dummy stages.

In an embodiment, the display apparatuses may be defined by four display apparatuses disposed in two rows and two columns.

In an embodiment, a data driving circuit of a first display apparatus disposed in a first row and a first column among the four display apparatuses may be disposed at an upper side of the first display apparatus, and a data driving circuit of a second display apparatus disposed in the first row and a second column among the four display apparatuses may be disposed at an upper side of the second display apparatus. In such an embodiment, a data driving circuit of a third display apparatus disposed in a second row and the first column among the four display apparatuses may be disposed at a lower side of the third display apparatus, and a data driving circuit of a fourth display apparatus disposed in the second row and the second column among the four display apparatuses may be disposed at a lower side of the fourth display apparatus.

In an embodiment, the display panel of each of the display apparatuses may include a contact pixel disposed right adjacent to adjacent display apparatus and a normal pixel not disposed right adjacent to the adjacent display apparatus. In such an embodiment, a width of the contact pixel may be less than a width of the normal pixel.

In an embodiment, a width of an opening portion of the contact pixel may be substantially the same as a width of an opening portion of the normal pixel.

In an embodiment, the display apparatuses may be defined by four display apparatuses disposed in one row and four columns.

In an embodiment, the data driving circuits of each of the four display apparatuses may be disposed at an upper side or a lower side of the display apparatuses.

According to embodiments of the display apparatus and the display system including the display apparatus according to the invention, the gate driving circuit is disposed in the display area of the display panel so that the dead space of the display apparatus may be reduced.

In such embodiments, the dead space of the display system including the plurality of display apparatuses which are connected to each other may be reduced. In such embodiments, the width of the seam line corresponding to an area in which the plural display apparatuses are connected may be reduced.

BRIEF DESCRIPTION OF THE DRAWINGS

The above and other features of the invention will become more apparent by describing in detailed embodiments thereof with reference to the accompanying drawings, in which.

DETAILED DESCRIPTION

Figure 1:
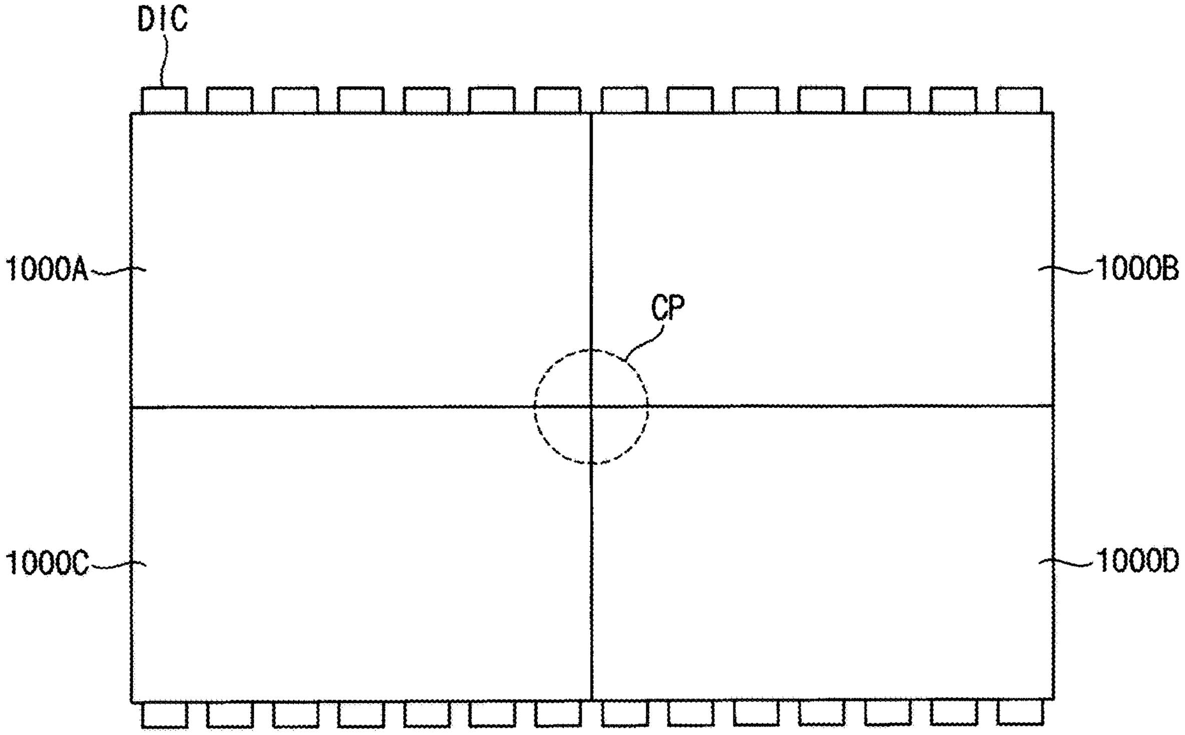
FIG. 1 is a block diagram illustrating a display system according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
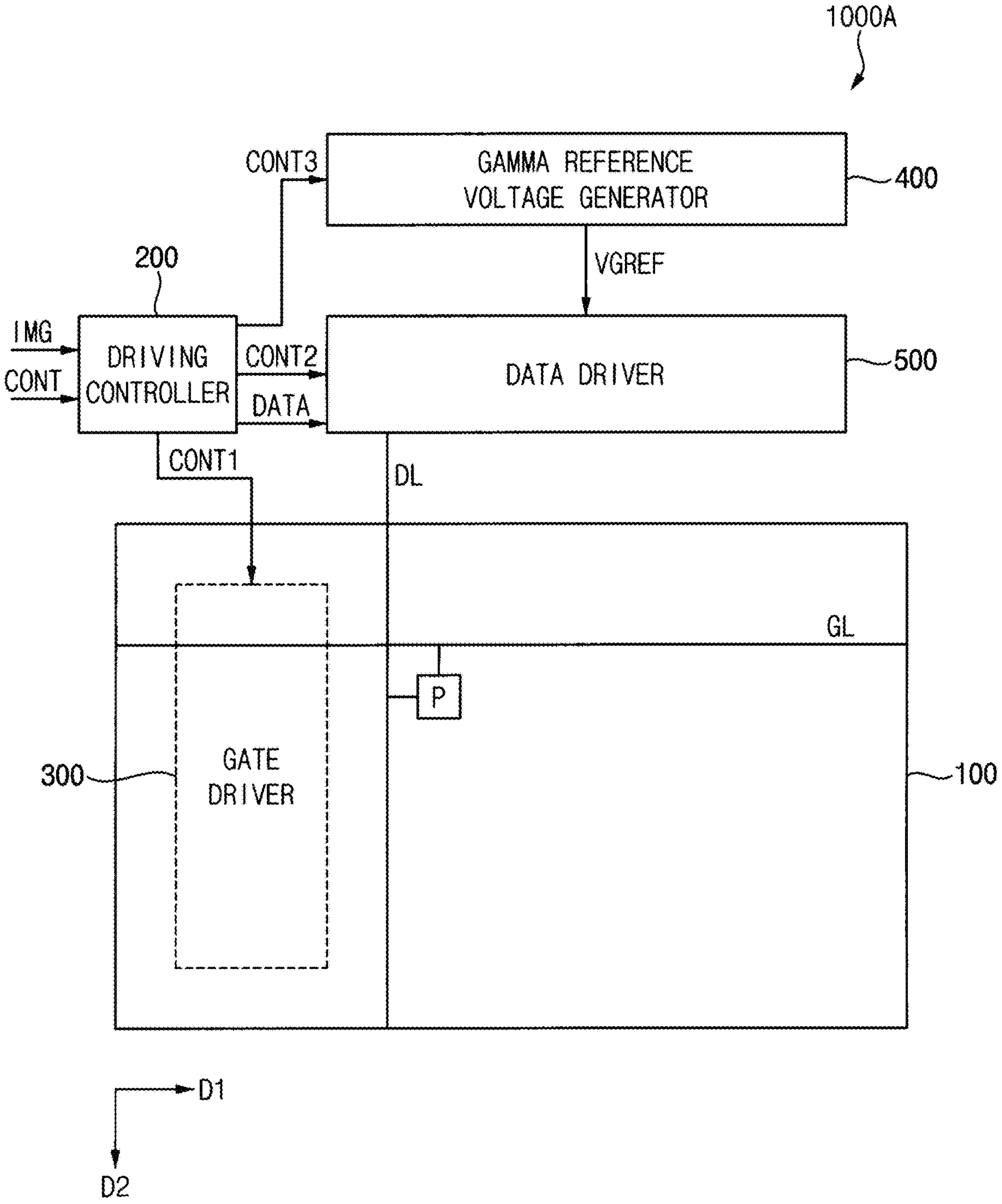
FIG. 2 is a block diagram illustrating an embodiment of a first display apparatus of FIG. 1.

FIG. 1 is a block diagram illustrating a display system according to an embodiment of the invention. FIG. 2 is a block diagram illustrating an embodiment of a first display apparatus 1000A of FIG. 1.

Referring to FIGS. 1 and 2, an embodiment of the display system includes a plurality of display apparatuses 1000A, 1000B, 1000C and 1000D connected to each other. In an embodiment, as shown in FIG. 1, the display system may include four display apparatuses 1000A, 1000B, 1000C and 1000D disposed in two rows and two columns. The four display apparatuses 1000A, 1000B, 1000C and 1000D may form a large sized television.

Each of the display apparatuses 1000A, 1000B, 1000C and 1000D may include a display panel 100 for displaying an image and including a plurality of pixels P in a matrix form, a data driver 500 for applying a data voltage to a data line of the display panel 100 and a gate driver 300 for applying a gate output signal to a gate line GL of the display panel 100. The gate driver 300 is disposed between opening portions in the display area of the display panel 100. Herein, the opening portions in the display area may be light emitting portions. Herein, the data driver 500 may be also referred as a data driving circuit and the gate driver 300 may be also referred as a gate driving circuit.

In one embodiment, for example, the data driver of the display apparatus (e.g. 1000A, 1000B, 1000C and 1000D) may include a plurality of data driving chips DIC. In an embodiment, as shown in FIG. 1, each of the display apparatus includes seven data driving chips DIC, but the invention may not be limited to the number of the data driving chips DIC.

A data driver 500 (DIC) of a first display apparatus 1000A disposed in a first row and a first column among the four display apparatuses 1000A, 1000B, 1000C and 1000D may be disposed at an upper side of the first display apparatus 1000A. A data driver 500 (DIC) of a second display apparatus 1000B disposed in the first row and a second column among the four display apparatuses 1000A, 1000B, 1000C and 1000D may be disposed at an upper side of the second display apparatus 1000B. A data driver 500 (DIC) of a third display apparatus 1000C disposed in a second row and the first column among the four display apparatuses 1000A, 1000B, 1000C and 1000D may be disposed at a lower side of the third display apparatus 1000C. A data driver 500 (DIC) of a fourth display apparatus 1000D disposed in the second row and the second column among the four display apparatuses 1000A, 1000B, 1000C and 1000D may be disposed at a lower side of the fourth display apparatus 1000D.

In an embodiment, as shown in FIG. 2, the display apparatus (e.g. the first display apparatus 1000A) includes a display panel 100 and a display panel driver. The display panel driver includes a driving controller 200, a gate driver 300, a gamma reference voltage generator 400 and a data driver 500.

The display panel 100 has a display region on which an image is displayed and a peripheral region adjacent to the display region.

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

In one embodiment, for example, the display panel 100 may be a quantum-dot nano light emitting diode display panel including a nano light emitting diode and a quantum-dot color filter. In one embodiment, for example, the display panel 100 may be a quantum-dot organic light emitting diode display panel including an organic light emitting diode and a quantum-dot color filter. In one embodiment, for example, the display panel 100 may be an organic light emitting diode display panel including an organic light emitting diode. In one embodiment, for example, the display panel 100 may be a liquid crystal display panel including a liquid crystal layer.

The driving controller 200 receives input image data IMG and an input control signal CONT from an external apparatus. In an embodiment, the input image data may include red image data, green image data and blue image data. The input image data may further include white image data. Alternatively, the input image data may include magenta image data, yellow image data and cyan image data. The input control signal CONT may include a master clock signal and a data enable signal. The input control signal CONT may include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 sequentially outputs the gate signals to the gate lines GL.

In an embodiment, the gate driver 300 may be disposed or integrated in a display area of the display panel 100. In such an embodiment, the gate driver 300 may be disposed between the pixels P of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages of an analog type using the gamma reference voltages VGREF. The data driver 500 outputs the data voltages to the data lines DL.

The data driver 500 may be directly mounted on the display panel 100, or be connected to the display panel 100 in a transmission control protocol ("TCP") type. Alternatively, the data driver 500 may be integrated on the display panel 100.

In an embodiment, the driving controller 200, the gamma reference voltage generator 400 and the data driver 500 may be integrally formed with each other as a single unit. In one embodiment, for example, the driving controller 200, the gamma reference voltage generator 400 and the data driver 500 may be formed as a single chip.

Figure 3:
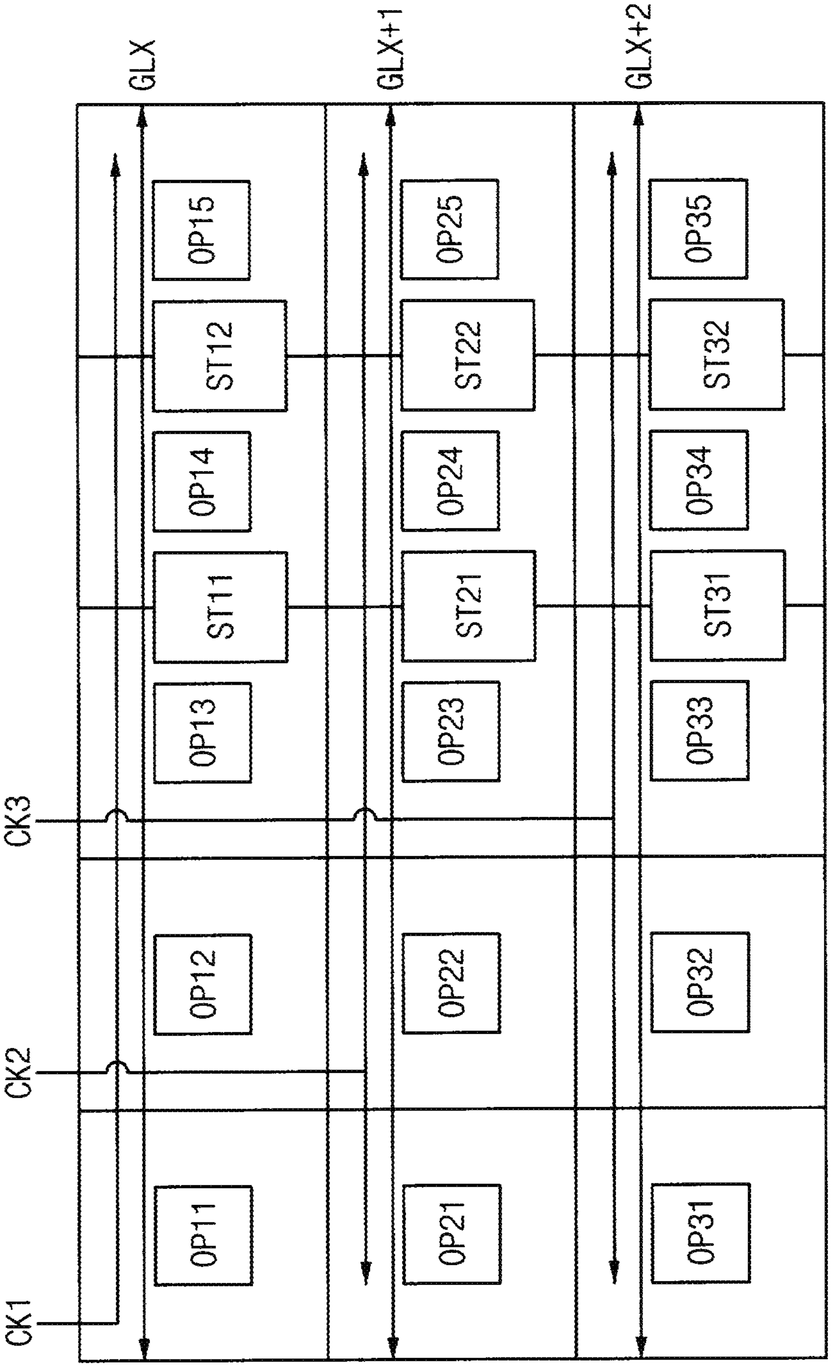
FIG. 3 is a conceptual diagram illustrating a portion of a display panel of FIG. 2.
Figure 4A:
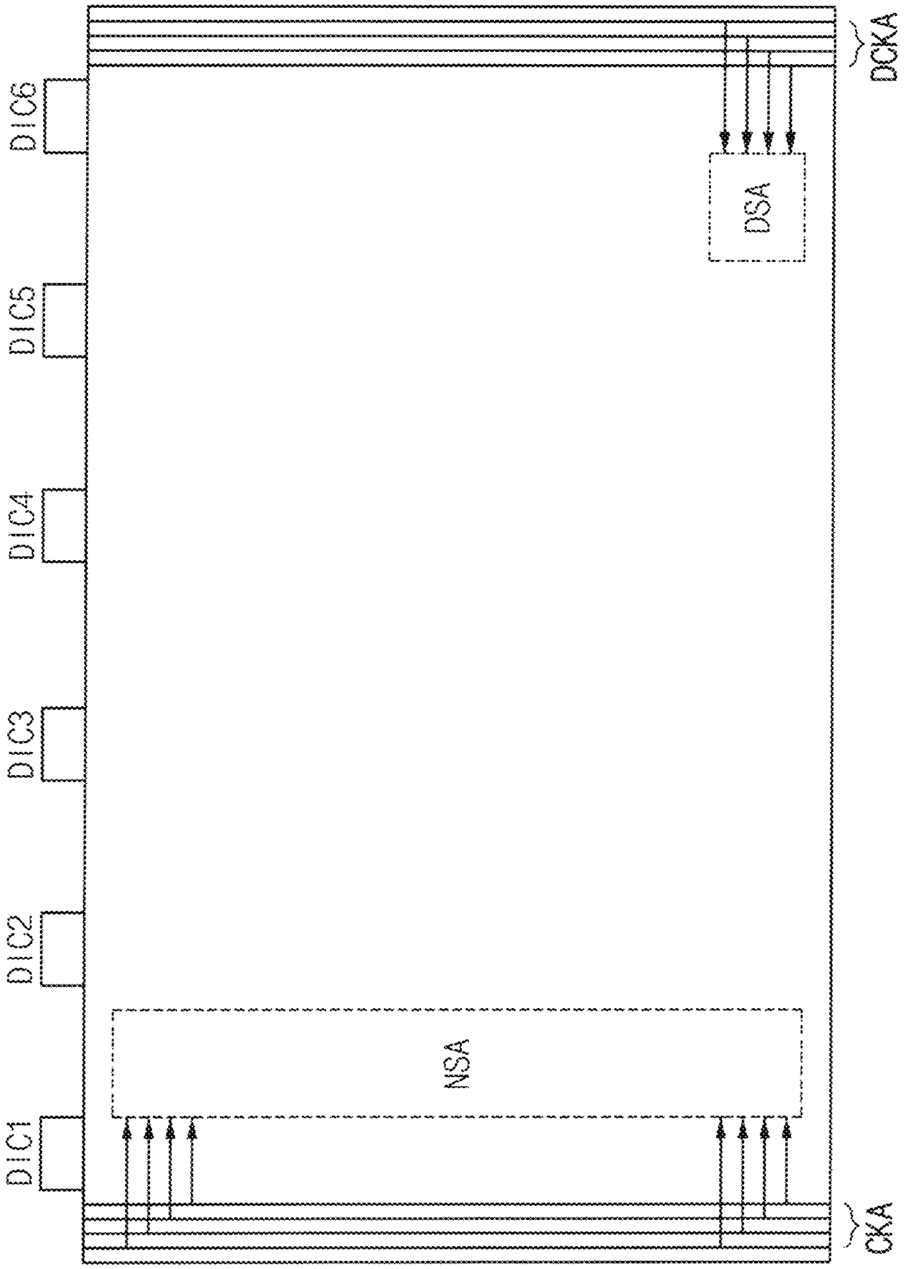
FIG. 4A is a plan view illustrating a location of a gate driver disposed in the display panel of FIG. 2.
Figure 4B:
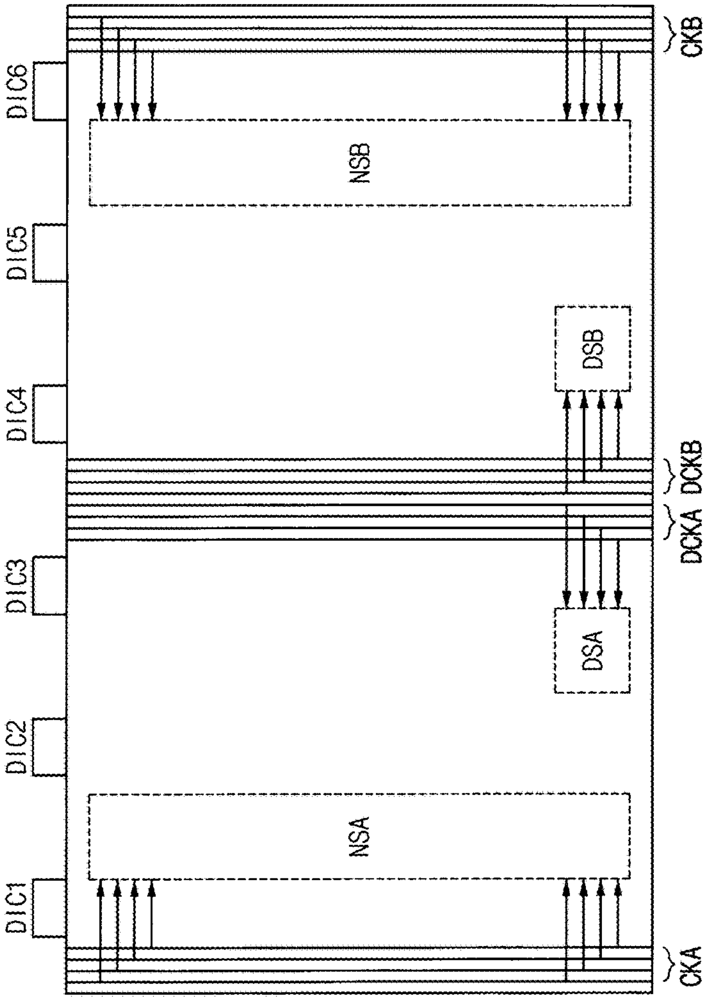
FIG. 4B is a plan view illustrating a location of the gate driver disposed in the display panel of FIG. 2.
Figure 4C:
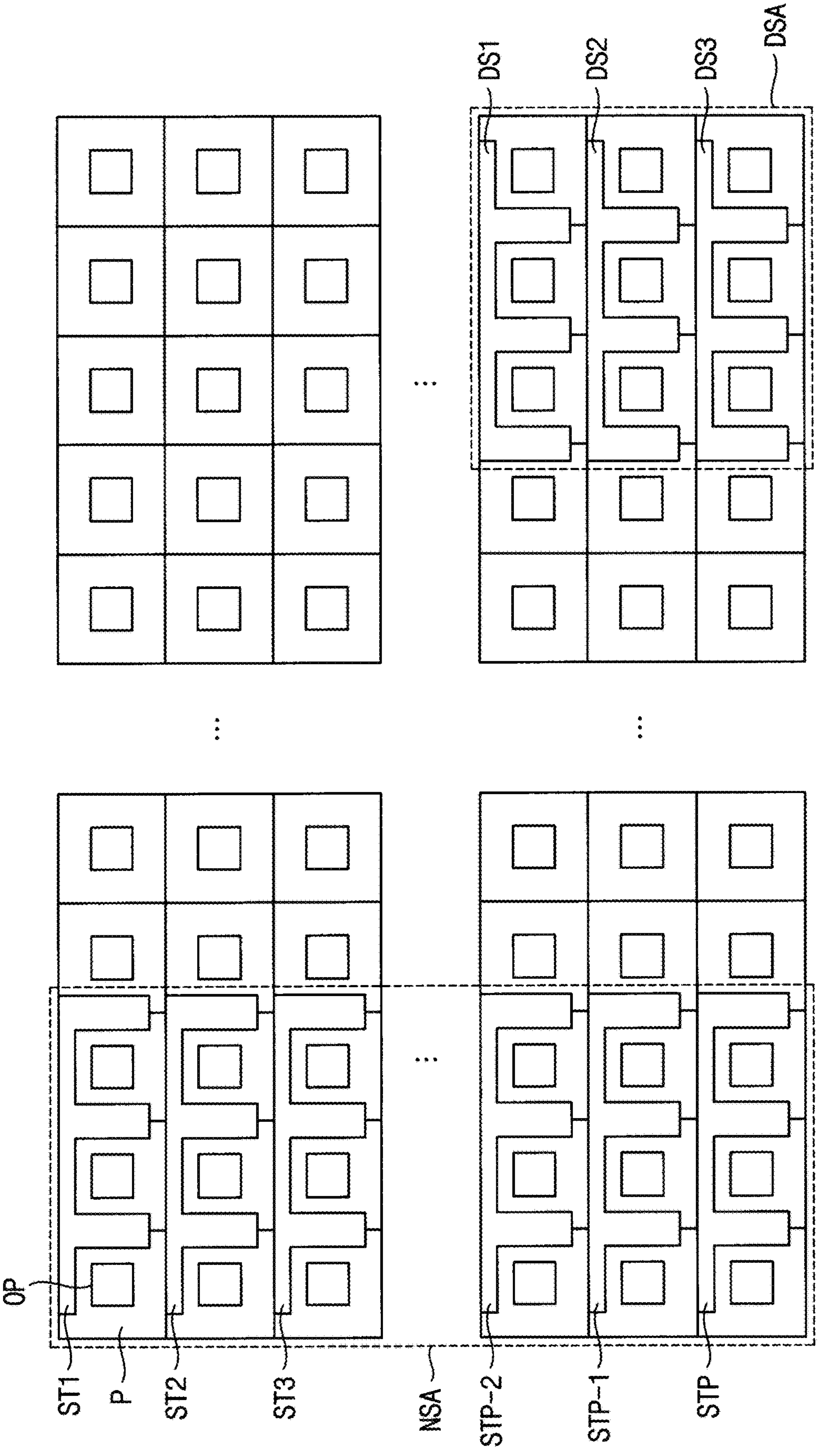
FIG. 4C is a plan view illustrating a normal stage column and a dummy stage column of the gate driver disposed in the display panel of FIG. 2.

FIG. 3 is a conceptual diagram illustrating a portion of the display panel 100 of FIG. 2. FIG. 4A is a plan view illustrating a location of the gate driver 300 disposed in the display panel 100 of FIG. 2. FIG. 4B is a plan view illustrating a location of the gate driver 300 disposed in the display panel 100 of FIG. 2. FIG. 4C is a plan view illustrating a normal stage column NSA and a dummy stage column DSA of the gate driver 300 disposed in the display panel 100 of FIG. 2.

Referring to FIGS. 1 to 4C, an embodiment of the gate driving circuit 300 may be disposed between opening portions OP11 to OP35 in the display area of the display panel 100.

In one embodiment, for example, the gate driving circuit 300 may include the normal stage column (NSA in FIG. 4A, NSA and NSB in FIG. 4B) extending in a pixel column direction D2 of the display panel 100 and including a plurality of normal stages.

Each normal stage may apply the gate output signal to a single corresponding pixel row. In such an embodiment, the normal stages and the pixel rows are in one-to-one correspondence with each other. The one normal stage may be disposed at an area corresponding to a plurality of pixel columns. In an embodiment, as shown in FIG. 3, an X-th normal stage for applying gate output signal to an X-th gate line GLX may include a first circuit portion (corresponding to ST11) and a second circuit portion (corresponding to ST12). In such an embodiment, an (X+1)-th normal stage for applying gate output signal to an (X+1)-th gate line GLX+1 may include a third circuit portion (corresponding to ST21) and a fourth circuit portion (corresponding to ST22). In such an embodiment, an (X+2)-th normal stage for applying gate output signal to an (X+2)-th gate line GLX+2 may include a fifth circuit portion (corresponding to ST31) and a sixth circuit portion (corresponding to ST32).

In an embodiment, as shown in FIG. 3, the X-th normal stage is disposed at a first circuit area ST11 and a second circuit area ST12 corresponding to at least two pixel columns, respectively, the (X+1)-th normal stage is disposed at a third circuit area ST21 and a fourth circuit area ST22 corresponding to at least two pixel columns respectively, and the (X+2)-th normal stage is disposed at a fifth circuit area ST31 and a sixth circuit area ST32 corresponding to at least two pixel columns respectively. In such an embodiment, each normal stage may be disposed at an area corresponding to the plurality of the pixel columns. FIG. 3 shows, for convenience of illustration and description, an embodiment where one normal stage may be disposed at the area corresponding to two pixel columns or three pixel columns, but the invention may not be limited thereto. In one alternative embodiment, for example, one normal stage may be disposed at an area corresponding to ten or more pixel columns.

The normal stage includes a plurality of transistors. A first group of the transistors disposed at the first circuit area ST11 may be disposed between an M-th pixel column (e.g. a third pixel column OP13, OP23 and OP33 of FIG. 3) and an (M+1)-th pixel column (e.g. a fourth pixel column OP14, OP24 and OP34 of FIG. 3). A second group of the transistors disposed at the second circuit area ST12 may be disposed between the (M+1)-th pixel column (e.g. the fourth pixel column OP14, OP24 and OP34 of FIG. 3) and an (M+2)-th pixel column (e.g. a fifth pixel column OP15, OP25 and OP35 of FIG. 3).

The gate driving circuit 300 may include a dummy stage column disposed adjacent to an end portion of the normal stage column in a pixel row direction D1 and including a plurality of dummy stages. Similar to the normal stage in FIG. 3, each dummy stage may be disposed at an area corresponding to a plurality of pixel columns.

In an embodiment, at least one of the dummy stages may output a reset carry signal to turn off the gate output signal to at least one of the normal stages. In one embodiment, for example, the dummy stages may not output the gate output signal to the gate lines.

The dummy stage may include a plurality of dummy transistors. Similarly to the normal stages described above referring to FIG. 3, a first group of the dummy transistors disposed at the first circuit area ST11 may be disposed between an L-th pixel column (e.g. a third pixel column OP13, OP23 and OP33 of FIG. 3) and an (L+1)-th pixel column (e.g. a fourth pixel column OP14, OP24 and OP34 of FIG. 3). A second group of the dummy transistors disposed at the second circuit area ST12 may be disposed between the (L+1)-th pixel column (e.g. the fourth pixel column OP14, OP24 and OP34 of FIG. 3) and an (L+2)-th pixel column (e.g. a fifth pixel column OP15, OP25 and OP35 of FIG. 3).

In an embodiment, as shown in FIG. 4A, the gate driving circuit 300 may include one normal stage column NSA disposed at a first end portion of the display panel 100 in the first direction D1 and one dummy stage column DSA disposed at a second end portion of the display panel 100 in the first direction D1.

In an embodiment, as shown in FIG. 4A, clock signals CKA applied to the normal stage column NSA may be provided to the display panel 100 by a first data driving chip (e.g. DIC1). Clock signals DCKA applied to the dummy stage column DSA may be provided to the display panel 100 by a last data driving chip (e.g. DIC6).

In an alternative embodiment, as shown in FIG. 4B, the gate driving circuit 300 may include a first normal stage column NSA disposed at a first end portion of the display panel 100 in the first direction D1, a first dummy stage column DSA disposed at a central portion of the display panel 100 in the first direction D1, a second normal stage column NSB disposed at a second end portion of the display panel 100 in the first direction D1, and a second dummy stage column DSB disposed at the central portion of the display panel 100 in the first direction D1 and adjacent to the first dummy stage column DSA.

In an embodiment, as shown in FIG. 4B, clock signals CKA applied to the first normal stage column NSA may be provided to the display panel 100 by a first data driving chip (e.g. DIC1). Clock signals DCKA applied to the first dummy stage column DSA may be provided to the display panel 100 by a last data driving chip (e.g. DIC3) of a left half area of the display panel 100. Clock signals CKB applied to the second normal stage column NSB may be provided to the display panel 100 by a last data driving chip (e.g. DIC6). Clock signals DCKB applied to the second dummy stage column DSB may be provided to the display panel 100 by a first data driving chip (e.g. DIC4) of a right half area of the display panel 100.

In an embodiment, as shown in FIG. 4C, the normal stage column NSA may include a plurality of normal stages (e.g. ST1, ST2, ST3, . . . , STP-2, STP-1 and STP). The dummy stage column DSA may include a plurality of dummy stages (e.g. DS1, DS2 and DS3). The normal stages may be disposed at an area corresponding to the plurality of the pixel columns. The normal stage may be disposed to overlap a side outside area of the pixel P and an upper outside area of the pixel P. The dummy stage may be disposed at an area corresponding to the plurality of the pixel columns. The dummy stage may be disposed to overlap a side outside area of the pixel P and an upper outside area of the pixel P.

The dummy stage may be disposed parallel with the normal stage in the first direction (the pixel row direction) D1. In one embodiment, for example, in FIG. 4C, the first dummy stage DS1 may be disposed parallel with the (P−2)-th normal stage STP-2 in the first direction D1. In one embodiment, for example, in FIG. 4C, the second dummy stage DS2 may be disposed parallel with the (P−1)-th normal stage STP-1 in the first direction D1. In one embodiment, for example, in FIG. 4C, the third dummy stage DS3 may be disposed parallel with the P-th normal stage STP in the first direction D1.

Figure 5:
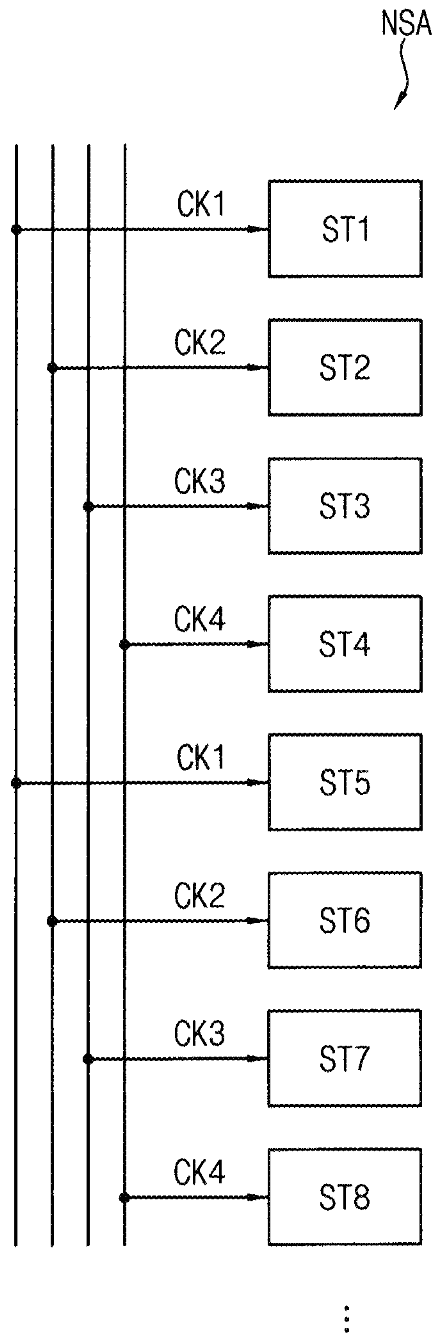
FIG. 5 is a block diagram illustrating the normal stage column of the gate driver of FIG. 2.
Figure 6:
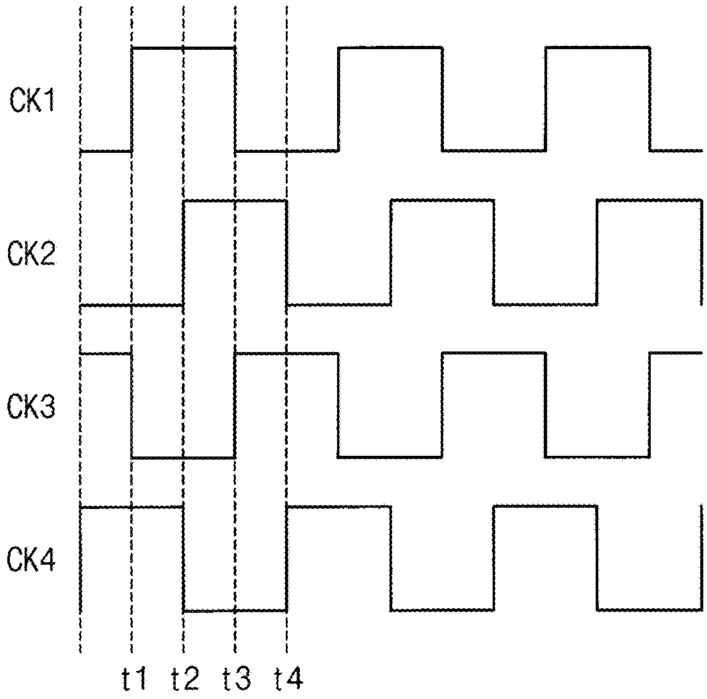
FIG. 6 is a waveform diagram illustrating clock signals applied to the stages of FIG. 5.

FIG. 5 is a block diagram illustrating the normal stage column NSA of the gate driver 300 of FIG. 2. FIG. 6 is a waveform diagram illustrating clock signals CK1, CK2, CK3 and CK4 applied to the stages of FIG. 5.

Referring to FIGS. 1 to 6, an embodiment of the normal stage column of the gate driver 300 includes a plurality of stages. In one embodiment, for example, clock signals (e.g. CK1, CK2, CK3 and CK4) having four different timings or phases may be applied to the stages of the gate driver 300.

In one embodiment, for example, a first clock signal CK1 may be applied to a first stage ST1. In such an embodiment, a second clock signal CK2 different from the first clock signal CK1 may be applied to a second stage ST2 adjacent to the first stage ST1. In such an embodiment, a third clock signal CK3 different from the first clock signal CK1 and the second clock signal CK2 may be applied to a third stage ST3 adjacent to the second stage ST2. In such an embodiment, a fourth clock signal CK4 different from the first clock signal CK1, the second clock signal CK2 and the third clock signal CK3 may be applied to a fourth stage ST4 adjacent to the third stage ST3.

In such an embodiment, the first clock signal CK1 may be applied to a fifth stage ST5 adjacent to the fourth stage ST4. In such an embodiment, the second clock signal CK2 may be applied to a sixth stage ST6 adjacent to the fifth stage ST5. In such an embodiment, the third clock signal CK3 may be applied to a seventh stage ST7 adjacent to the sixth stage ST6. In such an embodiment, the fourth clock signal CK4 may be applied to an eighth stage ST8 adjacent to seventh stage ST7.

The first to fourth clock signals CK1, CK2, CK3 and CK4 may be applied to the stages after the eighth stage ST8 in a same manner as described above.

The first clock signal CK1 has a rising edge corresponding to a first time point t1. The second clock signal CK2 has a rising edge corresponding to a second time t2 point later than the first time point t1. The third clock signal CK3 has a rising edge corresponding to a third time point t3 later than the second time point t2. The fourth clock signal CK4 has a rising edge corresponding to a fourth time point t4 later than the third time point t3.

In one embodiment, for example, the third clock signal CK3 may have the rising edge corresponding to a midpoint of adjacent rising edges of the first clock signal CK1. In one embodiment, for example, the fourth clock signal CK4 may have the rising edge corresponding to a midpoint of adjacent rising edges of the second clock signal CK2.

In one embodiment, for example, duty ratios of the first to fourth clock signals CK1, CK2, CK3 and CK4 may be about 50%. In an embodiment, the third clock signal CK3 may be an inverted signal of the first clock signal CK1. In such an embodiment, the fourth clock signal CK4 may be an inverted signal of the second clock signal CK2.

In one embodiment, for example, the duty ratios of the first to fourth clock signals CK1, CK2, CK3 and CK4 may be greater or less than about 50%. When the duty ratios of the first to fourth clock signals CK1, CK2, CK3 and CK4 may be greater or less than about 50%, the third clock signal CK3 may have the rising edge corresponding to a midpoint of adjacent rising edges of the first clock signal CK1 but the third clock signal CK3 may not be an inverted signal of the first clock signal CK1.

For convenience of illustration and description, FIG. 6 shows an embodiment where the four clock signals having different timings or phases are applied to the stages, but the invention is not limited thereto. Alternatively, eight clock signals having different timings or phases may be applied to the stages. Alternatively, six clock signals having different timings or phases may be applied to the stages. Alternatively, twelve clock signals having different timings or phases may be applied to the stages.

Figure 7:
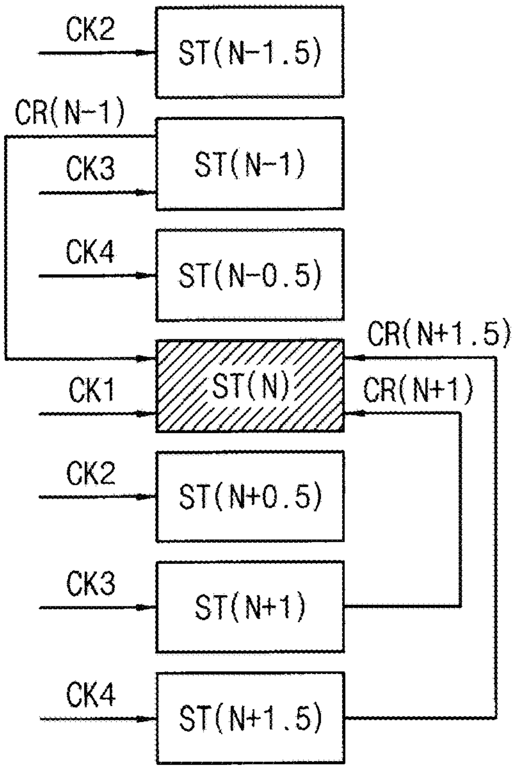
FIG. 7 is a block diagram illustrating clock signals and carry signals applied to an N-th stage of the gate driver of FIG. 2.

FIG. 7 is a block diagram illustrating clock signals and carry signals applied to an N-th stage ST(N) of the gate driver 300 of FIG. 2.

Referring to FIGS. 1 to 7, the N-th stage ST(N) of the gate driver 300 may receive the first clock signal CK1. The N-th stage ST(N) of the gate driver 300 may receive a previous carry signal CR(N−1), a first next carry signal CR(N+1.5) and a second next carry signal CR(N+1). Herein, N is a positive integer.

In one embodiment, for example, the previous carry signal CR(N−1) may be a carry signal of a second previous stage ST(N−1) disposed at a second previous stage position from the present stage ST(N). The second previous stage ST(N−1) may receive the third clock signal CK3. The third clock signal CK3 may be the inverted signal of the first clock signal CK1.

In one embodiment, for example, the first next carry signal CR(N+1.5) may be a carry signal of a third next stage ST(N+1.5) disposed at a third next stage position from the present stage ST(N). The third next stage ST(N+1.5) may receive the fourth clock signal CK4.

In one embodiment, for example, the second next carry signal CR(N+1) may be a carry signal of a second next stage ST(N+1) disposed at a second next stage position from the present stage ST(N). The second next stage ST(N+1) may receive the third clock signal CK3. The third clock signal CK3 may be the inverted signal of the first clock signal CK1.

For convenience of illustration and description, FIG. 7 shows an embodiment where the four clock signals having different timings or phases are applied to the stages, but the invention is not limited thereto. Alternatively, eight clock signals having different timings or phases are applied to the stages. The eighth clock signals may have rising edges having uniform gaps between one another.

In an embodiment where the eighth clock signals having different timings or phases are applied to the stages, the N-th stage ST(N) of the gate driver 300 may receive the first clock signal CK1. The N-th stage ST(N) of the gate driver 300 may receive a previous carry signal CR(N−1), a first next carry signal CR(N+1.5) and a second next carry signal CR(N+1).

In an embodiment where the eighth clock signals having different timings or phases are applied to the stages, the previous carry signal CR(N−1) may be a carry signal of a fourth previous stage ST(N−1) disposed at a fourth previous stage position from the present stage ST(N). The fourth previous stage ST(N−1) may receive a fifth clock signal CK5. The fifth clock signal CK5 may be the inverted signal of the first clock signal CK1.

In one embodiment, for example, the first next carry signal CR(N+1.5) may be a carry signal of a sixth next stage ST(N+1.5) disposed at a sixth next stage position from the present stage ST(N). The sixth next stage ST(N+1.5) may receive a seventh clock signal CK7.

In one embodiment, for example, the second next carry signal CR(N+1) may be a carry signal of a fourth next stage ST(N+1) disposed at a fourth next stage position from the present stage ST(N). The fourth next stage ST(N+1) may receive the fifth clock signal CK5. The fifth clock signal CK5 may be the inverted signal of the first clock signal CK1.

Figure 8:
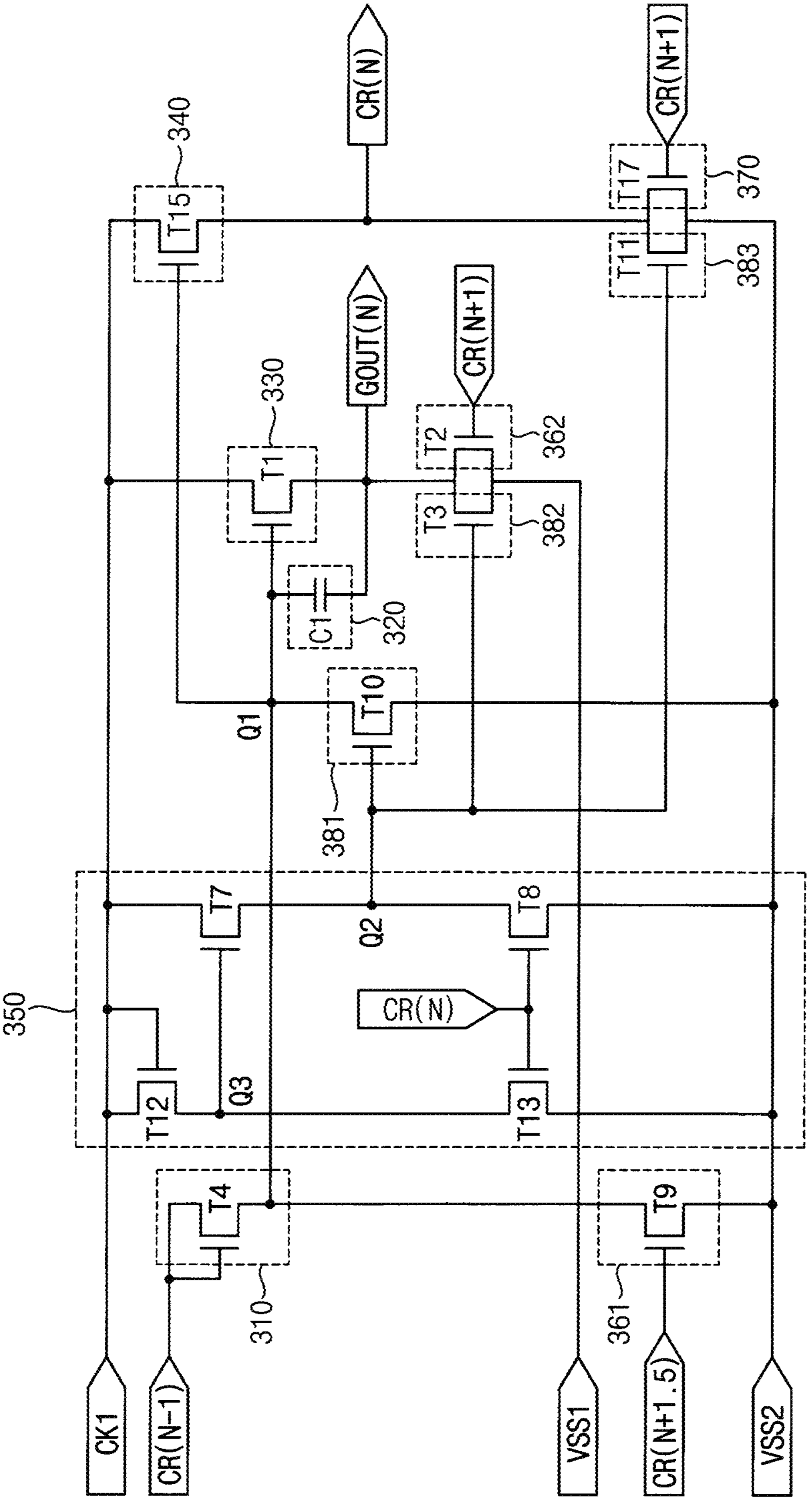
FIG. 8 is an equivalent circuit diagram illustrating an embodiment of the N-th stage of the gate driver of FIG. 2.
Figure 9:
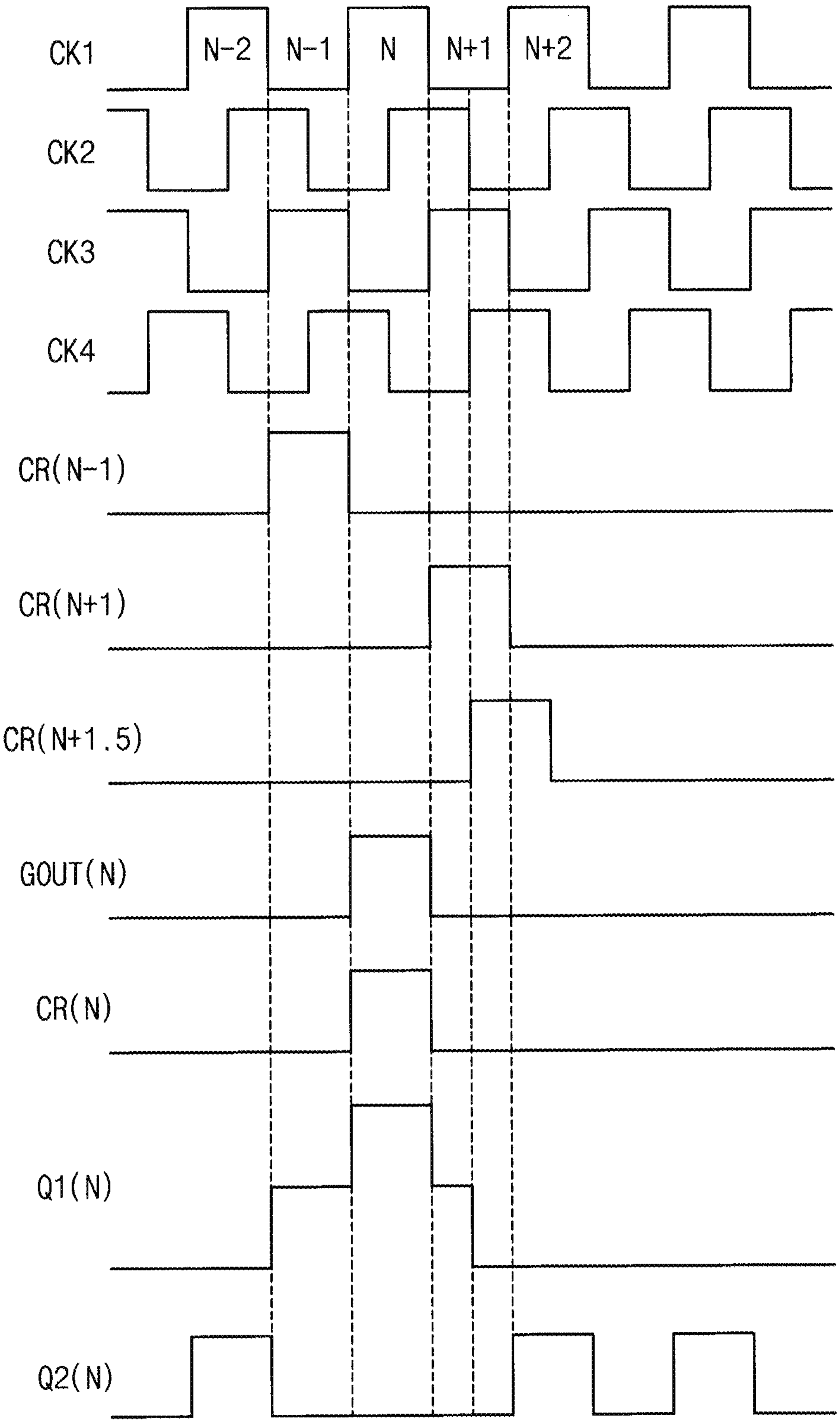
FIG. 9 is a waveform diagram illustrating input signals, node signals and output signals of the N-th stage of the gate driver of FIG. 8.

FIG. 8 is an equivalent circuit diagram illustrating an embodiment of the N-th stage ST(N) of the gate driver 300 of FIG. 2. FIG. 9 is a waveform diagram illustrating input signals, node signals and output signals of the N-th stage ST(N) of the gate driver 300 of FIG. 8.

Referring to FIGS. 1 to 9, an embodiment of the N-th stage ST(N) of the gate driver 300 receives first to fourth clock signals CK1, CK2, CK3 and CK4, a first off voltage VSS1 and a second off voltage VSS2. The gate driver 300 outputs a gate output signal GOUT.

The first to fourth clock signals CK1, CK2, CK3 and CK4 are applied to a clock terminal. The first off voltage VSS1 is applied to a first off terminal. The second off voltage VSS2 is applied to a second off terminal. The gate output signal GOUT is outputted from a gate output terminal.

In an embodiment, as shown in FIG. 9, the clock signal CK1 to CK4 is a square wave having a high level and a low level alternating with each other. The high level of the clock signal CK1 to CK4 may correspond to a gate on voltage. The low level of the clock signal CK1 to CK4 may correspond to the second gate off voltage VSS2. A duty ratio of the clock signal CK1 to CK4 may be about 50%. Alternatively, the duty ratio of the clock signal CK1 to CK4 may be greater than or less than about 50%.

The first off voltage VSS1 may be a direct-current ("DC") signal. The second off voltage may be a DC signal. The second off voltage may have a level lower than a level of the first off voltage VSS1.

The N-th stage outputs an N-th gate output signal GOUT (N) and an N-th carry signal CR(N) in response to a carry signal (e.g. CR(N−1)) of one of previous stages of the N-th stage. The N-th stage pulls down the N-th gate output signal GOUT(N) to the first off voltage VSS1 in response to a carry signal (e.g. CR(N+1)) of one of next stages of the N-th stage.

In a similar manner, first to last stages sequentially outputs gate output signals GOUT.

The (N−1)-th carry signal CR(N−1) is applied to an (N−1)-th carry terminal. The (N+1)-th carry signal CR(N+1) is applied to an (N+1)-th carry terminal. The (N+1.5)-th carry signal CR(N+1.5) is applied to an (N+1.5)-th carry terminal. The N-th carry signal CR(N) is outputted from an N-th carry terminal. The (N−1)-th carry signal may be a carry signal of the second previous stage ST(N−1) disposed at a second previous stage position from the present stage ST(N) of FIG. 7. The (N+1)-th carry signal may be a carry signal of the second next stage ST(N+1) disposed at a second next stage position from the present stage ST(N) of FIG. 7. The (N+1.5)-th carry signal may be a carry signal of the third next stage ST(N+1.5) disposed at a third next stage position from the present stage ST(N) of FIG. 7.

An embodiment of the N-th stage may include a pull-up control part 310, a charging part 320, a pull-up part 330, a carry part 340, an inverting part 350, a first pull-down part 361, a second pull-down part 362, a carry pull-down part 370, a first holding part 381, a second holding part 382 and a third holding part 383.

The pull-up control part 310 includes a fourth transistor T4. The fourth transistor T4 includes a control electrode and an input electrode commonly connected to the (N−1)-th carry terminal, and an output electrode connected to a first node Q1. The first node Q1 is connected to a control electrode of the pull-up part 330.

The charging part 320 includes a charging capacitor C1. The charging capacitor C1 includes a first electrode connected to the first node Q1 and a second electrode connected to the gate output terminal.

The pull-up part 330 outputs the first clock signal CK1 as the N-th gate output signal GOUT(N) in response to a signal applied to the first node Q1.

The pull-up part 330 includes a first transistor T1. The first transistor T1 includes a control electrode connected to the first node Q1, an input electrode connected to the clock terminal and an output electrode connected to the gate output terminal.

In one embodiment, for example, the control electrode of the first transistor T1 may be a gate electrode, the input electrode of the first transistor T1 may be a source electrode, and the output electrode of the first transistor T1 may be a drain electrode.

The carry part 340 outputs the first clock signal CK1 as the N-th carry signal CR(N) in response to the signal applied to the first node Q1.

The carry part 340 includes a fifteenth transistor T15. The fifteenth transistor T15 includes a control electrode connected to the first node Q1, an input electrode connected to the clock terminal and an output electrode connected to the N-th carry terminal.

In one embodiment, for example, the control electrode of the fifteenth transistor T15 may be a gate electrode, the input electrode of the fifteenth transistor T15 may be a source electrode, and the output electrode of the fifteenth transistor T15 may be a drain electrode.

The inverting part 350 generates an inverting signal based on the first clock signal CK1 and the second off voltage VSS2 to output the inverting signal to a second node Q2. The second node Q2 is also referred to as an inverting node.

The inverting part 350 includes a twelfth transistor T12, a thirteenth transistor T13, a seventh transistor T7 and an eighth transistor T8. The twelfth transistor T12 and the thirteenth transistor T13 are connected to each other in series. The seventh transistor T7 and the eighth transistor T8 are connected to each other in series.

The twelfth transistor T12 includes a control electrode and an input electrode commonly connected to the clock terminal, and an output electrode connected to a third node Q3. The seventh transistor T7 includes a control electrode connected to the third node Q3, an input electrode connected to the clock terminal and an output electrode connected to the second node Q2. The thirteenth transistor T13 includes a control electrode connected to the N-th carry terminal, an input electrode connected to the second off terminal and an output electrode connected to the third node Q3. The eighth transistor T8 includes a control electrode connected to the N-th carry terminal, an input electrode connected to the second off terminal and an output electrode connected to the second node Q2.

In one embodiment, for example, the control electrodes of the twelfth, seventh, thirteenth and eighth transistors T12, T7, T13 and T8 may be gate electrodes, the input electrode of the twelfth, seventh, thirteenth and eighth transistors T12, T7, T13 and T8 may be source electrodes, and the output electrode of the twelfth, seventh, thirteenth and eighth transistors T12, T7, T13 and T8 may be drain electrodes.

The twelfth transistor T12 is also referred to as a first inverting transistor. The seventh transistor T7 also referred to as is a second inverting transistor. The thirteenth transistor T13 is also referred to as a third inverting transistor. The eighth transistor T8 is also referred to as a fourth inverting transistor.

The first pull-down part 361 pulls down the voltage at the first node Q1 to the second off voltage VSS2 in response to the (N+1.5)-th carry signal CR(N+1.5).

The first pull-down part 361 includes a ninth transistor T9. The ninth transistor T9 includes a control electrode connected to the (N+1.5)-th carry terminal, an input electrode connected to the second off terminal and an output electrode connected to the first node Q1.

Alternatively, the first pull-down part 361 may include two transistors connected to each other in series.

In one embodiment, for example, the control electrode of the ninth transistor T9 may be a gate electrode, the input electrode of the ninth transistor T9 may be a source electrode, the output electrode of the ninth transistor T9 may be a drain electrode.

The second pull-down part 362 pulls down the N-th gate output signal GOUT(N) to the first off voltage VSS1 in response to the (N+1)-th carry signal CR(N+1).

The second pull-down part 362 includes the second transistor T2. The second transistor T2 includes a control electrode connected to the (N+1)-th carry terminal, an input electrode connected to the first off terminal and an output electrode connected to the gate output terminal.

In one embodiment, for example, the control electrode of the second transistor T2 may be a gate electrode, the input electrode of the second transistor T2 may be a source electrode, and the output electrode of the second transistor T2 may be a drain electrode.

The carry pull-down part 370 pulls down the N-th carry signal CR(N) to the second off voltage VSS2 in response to the (N+1)-th carry signal CR(N+1).

The carry pull-down part 370 includes a seventeenth transistor T17. The seventeenth transistor T17 includes a control electrode connected to the (N+1)-th carry terminal, an input electrode connected to the second off terminal and an output electrode connected to the N-th carry terminal.

In one embodiment, for example, the control electrode of the seventeenth transistor T17 may be a gate electrode, the input electrode of the seventeenth transistor T17 may be a source electrode, and the output electrode of the seventeenth transistor T17 may be a drain electrode.

The first holding part 381 pulls down the voltage at the first node Q1 to the second off voltage VSS2 in response to the inverting signal applied to the second node Q2.

The first holding part 381 includes a tenth transistor T10. The tenth transistor T10 includes a control electrode connected to the second node Q2, an input electrode connected to the second off terminal and an output electrode connected to the first node Q1.

Alternatively, the first holding part 381 may include two transistors connected to each other in series.

In one embodiment, for example, the control electrode of the tenth transistor T10 may be a gate electrode, the input electrode of the tenth transistor T10 may be a source electrode, and the output electrode of the tenth transistor T10 may be a drain electrode.

The second holding part 382 pulls down the N-th gate output signal GOUT(N) to the first off voltage VSS1 in response to the inverting signal applied to the second node Q2.

The second holding part 382 includes a third transistor T3. The third transistor T3 includes a control electrode connected to the second node Q2, an input electrode connected to the first off terminal and an output electrode connected to the gate output terminal.

In one embodiment, for example, the control electrode of the third transistor T3 may be a gate electrode, the input electrode of the third transistor T3 may be a source electrode, and the output electrode of the third transistor T3 may be a drain electrode.

The third holding part 383 pulls down the N-th carry signal CR(N) to the second off voltage VSS2 in response to the inverting signal applied to the second node Q2.

The third holding part 383 includes an eleventh transistor T11. The eleventh transistor T11 includes a control electrode connected to the second node Q2, an input electrode connected to the second off terminal and an output electrode connected to the N-th carry terminal.

In one embodiment, for example, the control electrode of the eleventh transistor T11 may be a gate electrode. The input electrode of the eleventh transistor T11 may be a source electrode. The output electrode of the eleventh transistor T11 may be a drain electrode.

In an embodiment the first, second, third, fourth, seventh, eighth, ninth, tenth, eleventh, twelfth, thirteenth, fifteenth and seventeenth transistors may be oxide semiconductor transistors. A semiconductor layer of the oxide semiconductor transistor may include an oxide semiconductor. In one embodiment, for example, the semiconductor layer may include at least one selected from a zinc oxide, a tin oxide, a gallium indium zinc (Ga—In—Zn) oxide, an indium zinc (In—Zn) oxide, a indium tin (In—Sn) oxide and indium tin zinc (In—Sn—Zn) oxide, for example. The semiconductor layer 130 may include an oxide semiconductor doped with a metal such as aluminum (Al), nickel (Ni), copper (Cu), tantalum (Ta), molybdenum (Mo), hafnium (Hf), titanium (Ti), niobium (Nb), chromium Cr, tungsten (W). However, the invention is not limited to a material of the oxide semiconductor.

Alternatively, the first, second, third, fourth, seventh, eighth, ninth, tenth, eleventh, twelfth, thirteenth, fifteenth and seventeenth transistors may be amorphous silicon transistors.

FIG. 8 shows the equivalent circuit of an embodiment of the N-th stage of the gate driving circuit, but the structure of the stage of the gate driving circuit of the invention may not be limited to the structure of FIG. 8.

Referring to FIG. 9, the first clock signal CK1 has a high level corresponding to (N−2)-th stage, N-th stage, (N+2)-th stage and (N+4)-th stage. The third clock signal CK3 which is the inverting signal of the first clock signal CK1 has a high level corresponding to (N−1)-th stage, (N+1)-th stage and (N+3)-th stage.

The (N−1)-th carry signal CR(N−1) has a high level corresponding to the (N−1)-th stage. The (N+1)-th carry signal CR(N+1) has a high level corresponding to the (N+1)-th stage. The (N+1.5)-th carry signal CR(N+1.5) has a high level corresponding to a second half of the (N+1)-th stage and a first half of the (N+2)-th stage.

The gate output signal GOUT(N) of the N-th stage is synchronized with the first clock signal CK1, and has a high level corresponding to the N-th stage. The N-th carry signal CR(N) is synchronized with the first clock signal CK1, and has a high level corresponding to the N-th stage.

In an embodiment, as shown in FIGS. 8 and 9, a voltage of the first node Q1 of the N-th stage is increased to a first level corresponding to the (N−1)-th stage by the pull-up control part 310. The voltage at the first node Q1 of the N-th stage is increased to a second level, which is higher than the first level, corresponding to the N-th stage by the coupling generated at the pull-up part 330 and the charging part 320. In such an embodiment, the voltage at the first node Q1 of the N-th stage is decreased to a third level, which is lower than the second level, corresponding to a beginning of the (N+1)-th stage by the coupling generated at the charging part 320. In such an embodiment, the voltage at the first node Q1 of the N-th stage is decreased to the lowest level, corresponding to a beginning of the second half of the (N+1)-th stage by the first pull-down part 361. In one embodiment, for example, the third level may be substantially the same as the first level.

A voltage at the second node Q2 of the N-th stage is synchronized with the first clock signal CK1. The voltage of the second node Q2 of the N-th stage has a high level corresponding to the (N−2)-th stage, (N+2)-th stage and the (N+4)-th stage by the inverting part 350. The voltage of the second node Q2 of the N-th stage has a high level except for the N-th stage at which the gate output signal GOUT has a high level. The voltage of the second node Q2 may be an inverting signal.

Figure 10:
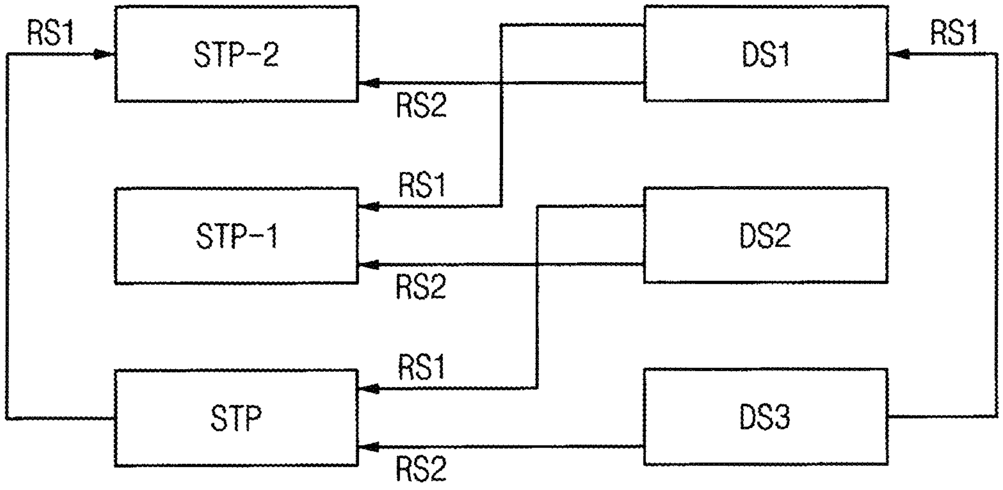
FIG. 10 is a block diagram illustrating normal stages and dummy stages of the gate driver of FIG. 2.

FIG. 10 is a block diagram illustrating normal stages STP-2, STP-1 and STP and dummy stages DS1, DS2 and DS3 of the gate driver 300 of FIG. 2.

Referring to FIGS. 1 to 10, in an embodiment, the first next carry signal CR(N+1.5) may be referred as a second reset carry signal RS2 and the second next carry signal CR(N+1) may be referred as a first reset carry signal RS1. As described above, the first reset carry signal RS1 and the second reset carry signal RS2 may turn off the gate output signal of the stage.

In an embodiment, at least one of the dummy stages DS1, DS2 and DS3 may output a reset carry signal (e.g. RS1 or RS2) to turn off the gate output signal of the normal stage STP-2, STP-1 and SPT to at least one of the normal stages STP-2, STP-1 and STP.

In one embodiment, for example, the first dummy stage DS1 may output the first reset carry signal RS1 to the STP-1 stage and may output the second reset carry signal RS2 to the STP-2 stage. In one embodiment, for example, the second dummy stage DS2 may output the first reset carry signal RS1 to the STP stage and may output the second reset carry signal RS2 to the STP-1 stage. In one embodiment, for example, the third dummy stage DS3 may output the second reset carry signal RS2 to the STP stage.

Herein, the normal stage STP may be a last stage of the normal stage column. In an embodiment, the dummy stage for outputting the reset carry signal to the normal stage may be disposed in the first direction D1 with respect to the normal stage.

The number of the dummy stages may be variously modified based on the number of the clock signals applied to the normal stages, the number of the reset carry signals applied to one stage and a location of the stage for providing the reset carry signal.

According to an embodiment, the gate driving circuit 300 is disposed in the display area of the display panel 100 such that the dead space of the display apparatus may be reduced.

In such an embodiment, the dead space of the display system including the plurality of display apparatuses 1000A, 1000B, 1000C and 1000D which are connected to each other may be reduced.

Figure 11:
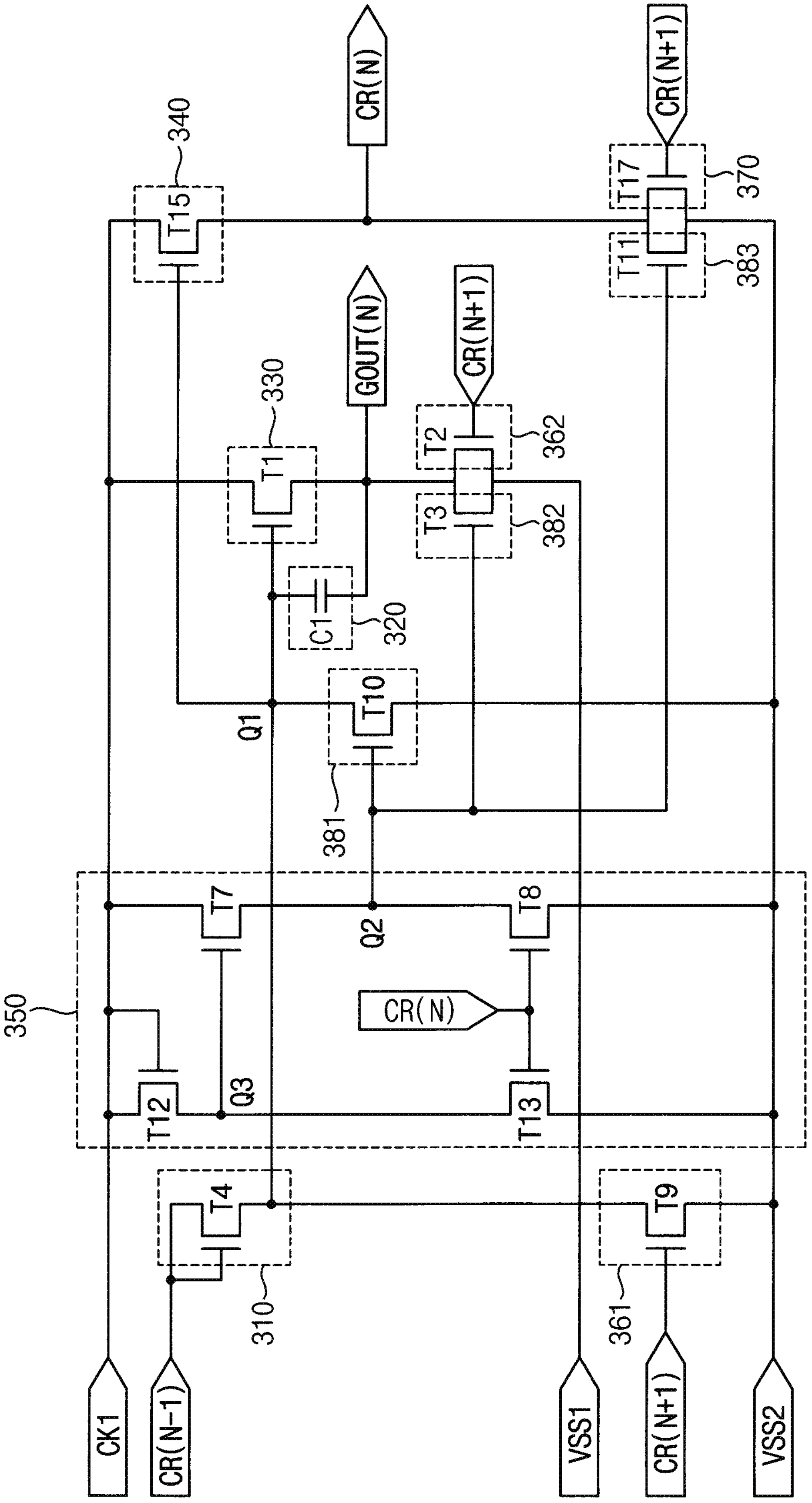
FIG. 11 is an equivalent circuit diagram illustrating an N-th stage of a gate driver of a display apparatus according to an alternative embodiment of the invention.
Figure 12:
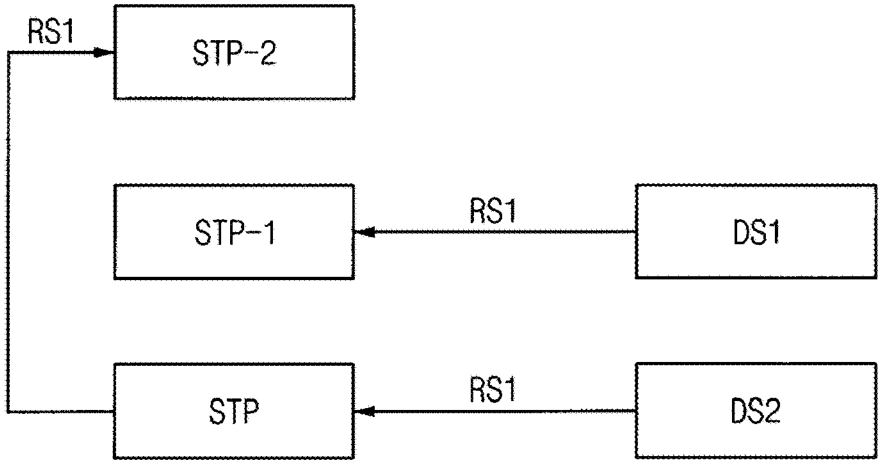
FIG. 12 is a block diagram illustrating normal stages and dummy stages of the gate driver of FIG. 11.

FIG. 11 is an equivalent circuit diagram illustrating an N-th stage of the gate driver 300 of a display apparatus according to an alternative embodiment of the invention. FIG. 12 is a block diagram illustrating normal stages STP-2, STP-1 and STP and dummy stages DS1 and DS2 of the gate driver 300 of FIG. 11.

The embodiment of the display system shown in FIGS. 11 and 12 is substantially the same as the embodiments of the display system described above referring to FIGS. 1 to 10 except for the carry signal applied to the first holding part of the gate driving circuit. Thus, the same reference numerals will be used to refer to the same or like parts as those of the embodiments of FIGS. 1 to 10, and any repetitive detailed description thereof will hereinafter be omitted or simplified.

Referring to FIGS. 1 to 6, 11 and 12, in an embodiment of the N-th stage, the first pull-down part 361 pulls down the voltage at the first node Q1 to the second off voltage VSS2 in response to the (N+1)-th carry signal CR(N+1).

In an embodiment, as shown in FIG. 11, the first pull-down part 361 includes a ninth transistor T9. The ninth transistor T9 includes a control electrode connected to the (N+1)-th carry terminal, an input electrode connected to the second off terminal and an output electrode connected to the first node Q1.

In such an embodiment, the stages may receive one reset carry signal RS1 instead of two reset carry signals RS1 and RS2.

In such an embodiment, the second next carry signal CR(N+1) may be referred as a first reset carry signal RS1. As described above, the first reset carry signal RS1 may turn off the gate output signal of the stage.

In such an embodiment, at least one of the dummy stages DS1 and DS2 may output a reset carry signal RS1 to turn off the gate output signal of the normal stage STP-2, STP-1 and SPT to at least one of the normal stages STP-2, STP-1 and STP.

In one embodiment, for example, the first dummy stage DS1 may output the first reset carry signal RS1 to the STP-1 stage. In one embodiment, for example, the second dummy stage DS2 may output the first reset carry signal RS1 to the STP stage.

Herein, the normal stage STP may be a last stage of the normal stage column. In such an embodiment, the dummy stage for outputting the reset carry signal to the normal stage may be disposed in the first direction D1 with respect to the normal stage.

According to embodiments of the invention, the gate driving circuit 300 is disposed in the display area of the display panel 100 such that the dead space of the display apparatus may be reduced.

In such embodiments, the dead space of the display system including the plurality of display apparatuses 1000A, 1000B, 1000C and 1000D which are connected to each other may be reduced.

Figure 13:
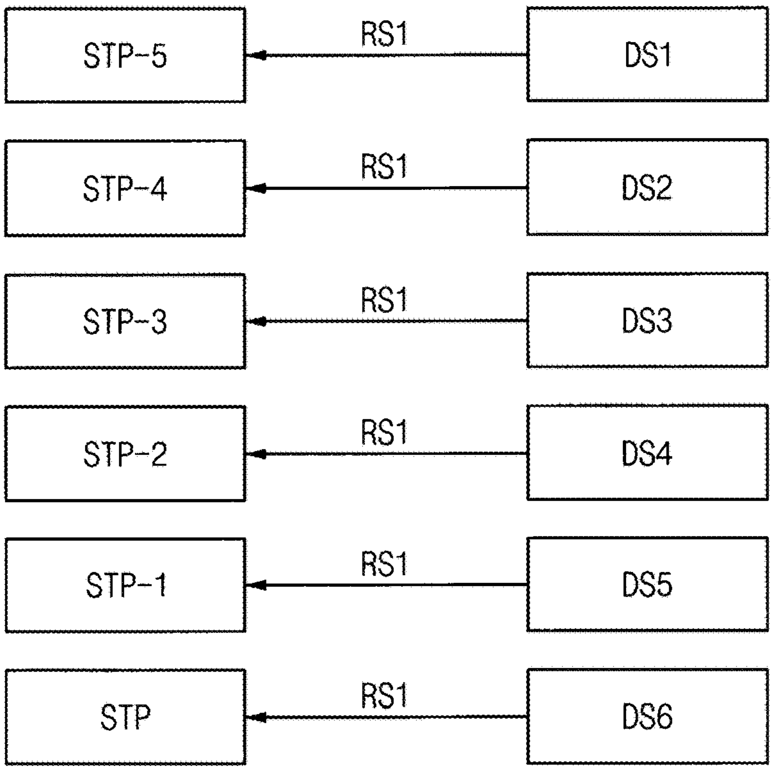
FIG. 13 is a block diagram illustrating normal stages and dummy stages of a gate driver of a display apparatus according to an alternative embodiment of the invention.

FIG. 13 is a block diagram illustrating normal stages and dummy stages of a gate driver of a display apparatus according to an alternative embodiment of the invention.

The embodiment of the display system shown in FIG. 13 is substantially the same as the embodiments of the display system described above referring to FIGS. 1 to 10 except for the normal stage and the dummy stage of the gate driving circuit. Thus, the same reference numerals will be used to refer to the same or like parts as those in the embodiment of FIGS. 1 to 10, and any repetitive detailed description thereof will be hereinafter omitted or simplified.

Referring to FIGS. 1 to 6 and 13, the number of the dummy stages may be variously modified based on the number of the clock signals applied to the normal stages, the number of the reset carry signals applied to one stage and a location of the stage providing the reset carry signal.

In an embodiment, the number of the clock signals may be 12 and the number of the reset carry signal applied to one stage may be 1, and a location of the stage for providing the reset carry signal to the present stage may be a fifth next stage.

In an embodiment, at least one of the dummy stages DS1, DS2, DS3, DS4, DS5 and DS6 may output a reset carry signal RS1 to turn off the gate output signal of the normal stage STP-5, STP-4, STP-3, STP-2, STP-1 and SPT to at least one of the normal stages STP-5, STP-4, STP-3, STP-2, STP-1 and SPT.

In one embodiment, for example, the first dummy stage DS1 may output the first reset carry signal RS1 to the STP-5 stage. In one embodiment, for example, the second dummy stage DS2 may output the first reset carry signal RS1 to the STP-4 stage. In one embodiment, for example, the third dummy stage DS3 may output the first reset carry signal RS1 to the STP-3 stage. In one embodiment, for example, the fourth dummy stage DS4 may output the first reset carry signal RS1 to the STP-2 stage. In one embodiment, for example, the fifth dummy stage DS5 may output the first reset carry signal RS1 to the STP-1 stage. In one embodiment, for example, the sixth dummy stage DS6 may output the first reset carry signal RS1 to the STP stage.

Herein, the normal stage STP may be a last stage of the normal stage column. In an embodiment, the dummy stage outputting the reset carry signal to the normal stage may be disposed in the first direction D1 with respect to the normal stage.

According to embodiments of the invention, the gate driving circuit 300 is disposed in the display area of the display panel 100 such that the dead space of the display apparatus may be reduced.

In such embodiments, the dead space of the display system including the plurality of display apparatuses 1000A, 1000B, 1000C and 1000D which are connected to each other may be reduced.

Figure 14:
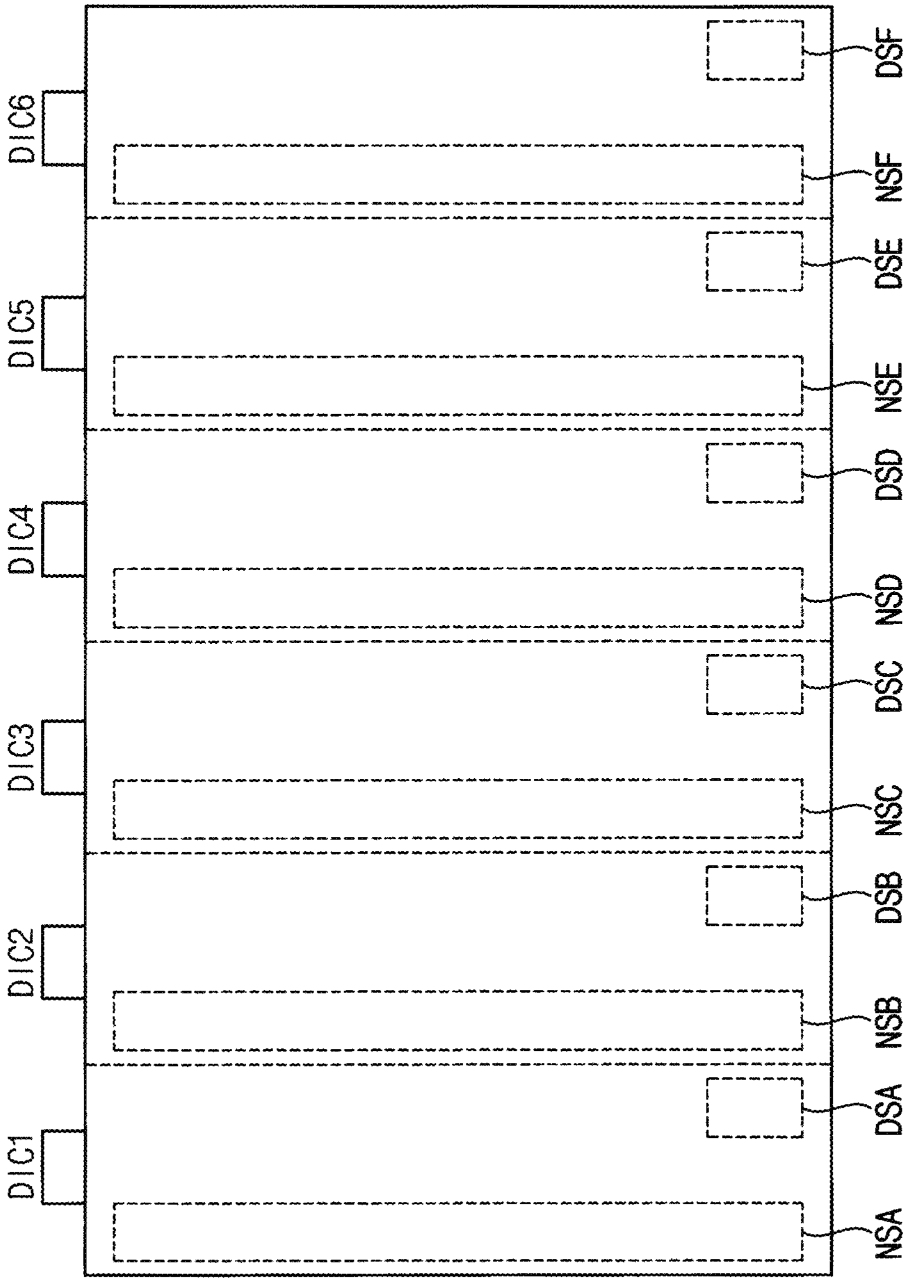
FIG. 14 is a plan view illustrating a location of a gate driver disposed in a display panel of a display apparatus according to an alternative embodiment of the invention.

FIG. 14 is a plan view illustrating a location of a gate driver 300 disposed in a display panel 100 of a display apparatus according to an alternative embodiment of the invention.

The embodiment of the display system shown in FIG. 14 is substantially the same as the embodiments of the display system described above referring to FIGS. 1 to 10 except for the number of the normal stage columns and the number of the dummy stage columns of the gate driving circuit. Thus, the same reference numerals will be used to refer to the same or like parts as those of the embodiments of FIGS. 1 to 10 and any repetitive detailed description thereof will hereinafter be omitted or simplified.

Referring to FIGS. 1 to 3, 5 to 10 and 14, in an embodiment, the gate driving circuit 300 may be disposed between opening portions OP11 to OP35 in the display area of the display panel 100.

In one embodiment, for example, the gate driving circuit 300 may include normal stage columns NSA, NSB, NSC, NSD, NSE and NSF extending in a pixel column direction D2 of the display panel 100 and including a plurality of normal stages.

Each normal stage may apply the gate output signal to a single corresponding pixel row. The normal stage may be disposed at an area corresponding to a plurality of pixel columns.

The gate driving circuit 300 may include a dummy stage column disposed adjacent to an end portion of the normal stage column in a pixel row direction D1 and including a plurality of dummy stages. Similar to the normal stage in FIG. 3, one dummy stage may be disposed at an area corresponding to a plurality of pixel columns.

In an embodiment, as shown in FIG. 14, the data driving circuit 500 may include a plurality of data driving chips (e.g. DIC1 to DIC6). The display panel 100 may be divided into a plurality of sub areas corresponding to the data driving chips (e.g. DIC1 to DIC6).

The gate driving circuit 300 may include one normal stage column and one dummy stage column for each of the sub areas. In one embodiment, for example, a first normal stage column NSA and a first dummy stage column DSA may be disposed in a first sub area corresponding to a first data driving chip DIC1. In one embodiment, for example, a second normal stage column NSB and a second dummy stage column DSB may be disposed in a second sub area corresponding to a second data driving chip DIC2. In one embodiment, for example, a third normal stage column NSC and a third dummy stage column DSC may be disposed in a third sub area corresponding to a third data driving chip DIC3. In one embodiment, for example, a fourth normal stage column NSD and a fourth dummy stage column DSD may be disposed in a fourth sub area corresponding to a fourth data driving chip DIC4. In one embodiment, for example, a fifth normal stage column NSE and a fifth dummy stage column DSE may be disposed in a fifth sub area corresponding to a fifth data driving chip DIC5. In one embodiment, for example, a sixth normal stage column NSF and a sixth dummy stage column DSF may be disposed in a sixth sub area corresponding to a sixth data driving chip DIC6.

According to embodiments of the invention, the gate driving circuit 300 is disposed in the display area of the display panel 100 such that the dead space of the display apparatus may be reduced.

In such embodiments, the dead space of the display system including the plurality of display apparatuses 1000A, 1000B, 1000C and 1000D which are connected to each other may be reduced.

Figure 15:
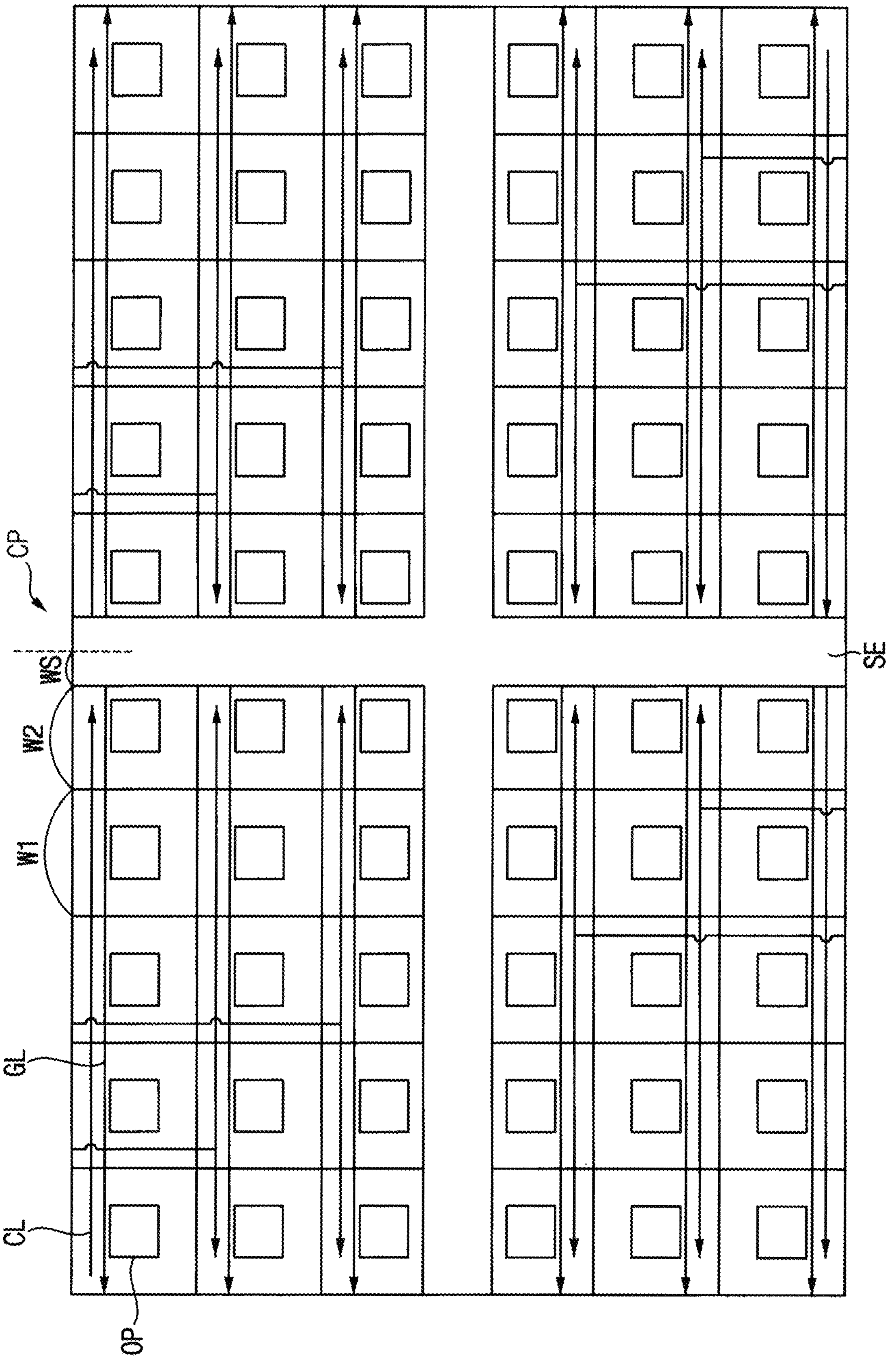
FIG. 15 is a conceptual diagram illustrating display panels corresponding to a central portion of a display system according to an embodiment of the invention.

FIG. 15 is a conceptual diagram illustrating display panels corresponding to a central portion CP of a display system according to an embodiment of the invention.

FIG. 15 may illustrates a portion of a display panel of a first display apparatus 1000A, a portion of a display panel of a second display apparatus 1000B, a portion of a display panel of a third display apparatus 1000C and a portion of a display panel of a fourth display apparatus 1000D which are disposed in the central portion CP of the display system of FIG. 1. In FIG. 15, CL may represent the clock line, GL may represent the gate line and SE may represent a sealant to connect the first to fourth display apparatuses 1000A, 1000B, 1000C and 1000D.

In an embodiment, the display panel of each of the display apparatuses may include a contact pixel disposed right adjacent to other display apparatuses and a normal pixel not disposed right adjacent to the other display apparatuses. In one embodiment, for example, the contact pixel may contact the adjacent display apparatus and the normal pixel may not contact the adjacent display apparatus. In one embodiment, for example, the contact pixel may contact the sealant SE and the normal pixel may not contact the sealant SE. A width of the contact pixel may be less than a width of the normal pixel. A width of an opening portion OP of the contact pixel may be substantially the same as a width of an opening portion OP of the normal pixel.

In one embodiment, for example, the width of the normal pixel in the first direction D1 is represented as W1 and the width of the contact pixel in the first direction D1 is represented as W2 in FIG. 15. A half of a width of the sealant SE in the first direction D1 is represented as WS. In an embodiment, the following equation may be satisfied:

$$W1=W2+WS$$

Thus, a pixel pitch W2+WS of the connecting portion is substantially the same as a pixel pitch W1 of the normal pixel so that the display defect due to the difference between the pixel pitch of the normal pixel and the pixel pitch of the connecting portion may be effectively prevented.

Figure 16:
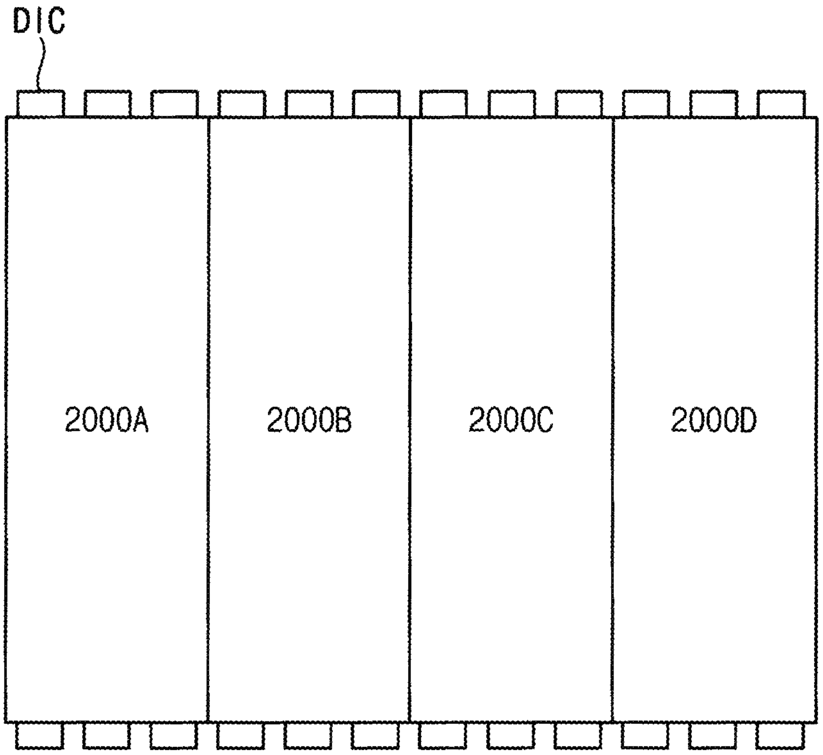
FIG. 16 is a block diagram illustrating a display system according to an alternative embodiment of the invention.

FIG. 16 is a block diagram illustrating a display system according to an alternative embodiment of the invention.

The embodiment of the display system shown in FIG. 16 is substantially the same as the embodiments of the display system described above referring to FIGS. 1 to 10 except for a shape of the display apparatus and positions of the display apparatuses. Thus, the same reference numerals will be used to refer to the same or like parts as those of the previous embodiment of FIGS. 1 to 10, and any repetitive detailed description thereof will hereinafter be omitted or simplified.

Referring to FIGS. 2 to 10 and 16, an embodiment of the display system includes a plurality of display apparatuses 2000A, 2000B, 2000C and 2000D connected to each other. In an embodiment, as shown in FIG. 16, the display apparatuses of the display system may include or be defined by four display apparatuses 2000A, 2000B, 2000C and 2000D disposed in one row and four columns. The four display apparatuses 2000A, 2000B, 2000C and 2000D may form a large sized television.

In such an embodiment, each of the display apparatuses 2000A, 2000B, 2000C and 2000D may include a display panel 100 for displaying an image and including a plurality of pixels P in a matrix form, a data driver 500 for applying a data voltage to a data line of the display panel 100 and a gate driver 300 for applying a gate output signal to a gate line GL of the display panel 100. The gate driver 300 is disposed between opening portions in the display area of the display panel 100. In such an embodiment, the data driver 500 may be also referred as a data driving circuit and the gate driver 300 may be also referred as a gate driving circuit.

In one embodiment, for example, the data driver of the display apparatus (e.g. 2000A, 2000B, 2000C and 2000D) may include a plurality of data driving chips DIC. FIG. 16 shows an embodiment where each of the display apparatus includes three data driving chips DIC disposed at an upper side and three data driving chips DIC disposed at a lower side, but the invention may not be limited to the number of the data driving chips DIC.

A data driver 500 (DIC) of the four display apparatuses 2000A, 2000B, 2000C and 2000D may be disposed at an upper side and a lower side of the display apparatuses 2000A, 2000B, 2000C and 2000D.

The gate driving circuit 300 may be disposed between opening portions OP11 to OP35 in the display area of the display panel 100.

The gate driving circuit 300 may include the normal stage column (NSA in FIG. 4A, NSA and NSB in FIG. 4B) extending in a pixel column direction D2 of the display panel 100 and including a plurality of normal stages.

Each normal stage may apply the gate output signal to a single corresponding pixel row. The normal stage may be disposed at an area corresponding to a plurality of pixel columns.

In an embodiment, the gate driver 300 are disposed in the display area of the display panel 100 so that the gate driving circuit 300 and the data driving circuit 500 are not disposed in a horizontal direction between the display apparatuses which are connected in one by four matrix connection. Thus, the width of the seam line may be reduced.

According to embodiments of the display apparatus and the display system including the display apparatus, the gate driving circuit is disposed in the display area of the display panel so that the dead space of the display apparatus may be reduced.

In such embodiments, the dead space of the display system including the plurality of display apparatuses which are connected to each other may be reduced. In such embodiments, the width of the seam line corresponding to an area in which the plural display apparatuses are connected may be reduced.

According to embodiments of the invention as described herein, the dead space of the display system may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel which displays an image, wherein the display panel comprises a plurality of pixels;

a data driving circuit which applies a data voltage to a data line of the display panel, the data line extending in a pixel column direction; and a gate driving circuit which applies a gate output signal to a gate line of the display panel, the gate line extending in a pixel row direction, wherein the gate driving circuit is disposed between opening portions in a display area of the display panel, and wherein the gate driving circuit comprises:

a normal stage column extending in the pixel column direction of the display panel and including a plurality of normal stages; and a dummy stage column disposed adjacent to an end portion of the normal stage column in the pixel row direction and including a plurality of dummy stages, and wherein a width of the normal stage column in the pixel column direction is greater than a width of the dummy stage column in the pixel column direction.

2. The display apparatus of claim 1, wherein the data driving circuit is disposed adjacent to a first side of the display panel and connected to the display panel.

3. The display apparatus of claim 1, wherein each of the normal stages applies the gate output signal to a single corresponding pixel row, and wherein each of the normal stages is disposed at an area corresponding to a plurality of pixel columns.

4. The display apparatus of claim 3, wherein a normal stage of the normal stages includes a plurality of transistors, wherein a first group of the transistors is disposed between an M-th pixel column and an (M+1)-th pixel column, wherein a second group of the transistors is disposed between the (M+1)-th pixel column and an (M+2)-th pixel column, and wherein M is a positive integer.

5. The display apparatus of claim 4, wherein each of the dummy stages is disposed at an area corresponding to a plurality of pixel columns.

6. The display apparatus of claim 4, wherein a normal stage of the normal stages comprises:

a pull-up control part which applies a previous carry signal of one of previous stages to a first node in response to the previous carry signal;

a pull-up part which outputs a clock signal as an N-th gate output signal in response to a signal at the first node;

a carry part which outputs the clock signal as an N-th carry signal in response to the signal at the first node;

a first pull-down part which pulls down the signal at the first node to a second off voltage in response to a first next carry signal of one of next stages; and a second pull-down part which pulls down the N-th gate output signal to a first off voltage in response to a second next carry signal of another of the next stages different from the first next carry signal, wherein N is a positive integer.

7. The display apparatus of claim 6, wherein the first next carry signal has a timing later than a timing of the second next carry signal.

8. The display apparatus of claim 7, wherein the first next carry signal is a carry signal of a third next stage disposed at a third next stage position from a present stage, and wherein the second next carry signal is a carry signal of a second next stage disposed at a second next stage position from the present stage.

9. The display apparatus of claim 1, wherein a dummy stage of the dummy stages includes a plurality of dummy transistors, wherein a first group of the dummy transistors is disposed between an L-th pixel column and an (L+1)-th pixel column, wherein a second group of the dummy transistors is disposed between the L+1-th pixel column and an (L+2)-th pixel column, and wherein L is a positive integer different from M.

10. The display apparatus of claim 1, wherein the gate driving circuit comprises:

one normal stage column disposed at a first end portion of the display panel in a first direction; and one dummy stage column disposed at a second end portion of the display panel in the first direction.

11. The display apparatus of claim 1, wherein the gate driving circuit comprises:

a first normal stage column disposed at a first end portion of the display panel in a first direction;

a first dummy stage column disposed at a central portion of the display panel in the first direction;

a second normal stage column disposed at a second end portion of the display panel in the first direction; and a second dummy stage column disposed at the central portion of the display panel in the first direction and adjacent to the first dummy stage column.

12. The display apparatus of claim 1, wherein the data driving circuit comprises a plurality of data driving chips, wherein the display panel is divided into a plurality of sub areas corresponding to the data driving chips, and wherein the gate driving circuit comprises one normal stage column and one dummy stage column for each of the sub areas.

13. The display apparatus of claim 1, wherein an entirety of the gate driving circuit is disposed between the opening portions in the display area of the display panel.

14. A display system comprising a plurality of display apparatuses connected to each other, wherein each of the display apparatuses comprises:

a display panel which displays an image, wherein the display panel comprises a plurality of pixels;

a data driving circuit which applies a data voltage to a data line of the display panel, the data line extending in a pixel column direction; and a gate driving circuit which applies a gate output signal to a gate line of the display panel, the gate line extending in a pixel row direction, wherein the gate driving circuit is disposed between opening portions in a display area of the display panel, and wherein the gate driving circuit comprises:

a normal stage column extending in the pixel column direction of the display panel and including a plurality of normal stages; and a dummy stage column disposed adjacent to an end portion of the normal stage column in the pixel row direction and including a plurality of dummy stages, and wherein a width of the normal stage column in the pixel column direction is greater than a width of the dummy stage column in the pixel column direction.

15. The display system of claim 14, wherein the display apparatuses are defined by four display apparatuses disposed in two rows and two columns.

16. The display system of claim 15, wherein a data driving circuit of a first display apparatus disposed in a first row and a first column among the four display apparatuses is disposed at an upper side of the first display apparatus, wherein a data driving circuit of a second display apparatus disposed in the first row and a second column among the four display apparatuses is disposed at an upper side of the second display apparatus, wherein a data driving circuit of a third display apparatus disposed in a second row and the first column among the four display apparatuses is disposed at a lower side of the third display apparatus, and wherein a data driving circuit of a fourth display apparatus disposed in the second row and the second column among the four display apparatuses is disposed at a lower side of the fourth display apparatus.

17. The display system of claim 15, wherein the display panel of each of the display apparatuses includes a contact pixel disposed right adjacent to adjacent display apparatus and a normal pixel not disposed right adjacent to the adjacent display apparatus, and wherein a width of the contact pixel is less than a width of the normal pixel.

18. The display system of claim 17, wherein a width of an opening portion of the contact pixel is substantially the same as a width of an opening portion of the normal pixel.

19. The display system of claim 14, wherein the display apparatuses are defined by four display apparatuses disposed in one row and four columns.

20. The display system of claim 19, wherein data driving circuit of each of the four display apparatuses are disposed at an upper side or a lower side of the display apparatuses.

* * * * *